US010737435B2

(12) United States Patent
Miura

(10) Patent No.: US 10,737,435 B2
(45) Date of Patent: Aug. 11, 2020

(54) PARTIAL DECORATION FORMING METHOD AND PARTIAL DECORATION FORMING APPARATUS

(71) Applicant: FU-SE VACUUM FORMING CO., LTD., Osaka (JP)

(72) Inventor: Takayuki Miura, Habikino (JP)

(73) Assignee: FU-SE VACUUM FORMING CO., LTD., Osaka (JP)

( * ) Notice: Subject to any disclaimer, the term of this patent is extended or adjusted under 35 U.S.C. 154(b) by 100 days.

(21) Appl. No.: 15/580,440

(22) PCT Filed: Feb. 2, 2016

(86) PCT No.: PCT/JP2016/053115
§ 371 (c)(1),
(2) Date: Dec. 7, 2017

(87) PCT Pub. No.: WO2017/098737
PCT Pub. Date: Jun. 15, 2017

(65) Prior Publication Data
US 2018/0178443 A1 Jun. 28, 2018

(30) Foreign Application Priority Data
Dec. 9, 2015 (JP) ................. 2015-239808

(51) Int. Cl.
*B29C 63/02* (2006.01)
*B29C 51/16* (2006.01)
(Continued)

(52) U.S. Cl.
CPC .............. *B29C 63/02* (2013.01); *B29C 51/10* (2013.01); *B29C 51/12* (2013.01); *B29C 51/16* (2013.01);
(Continued)

(58) Field of Classification Search
CPC ......... B29C 65/48; B29C 51/16; B29C 51/10; B29C 51/303; B29C 51/262;
(Continued)

(56) References Cited

U.S. PATENT DOCUMENTS 9,889,601 B2   2/2018  Miura
2012/0013048 A1* 1/2012 Bienhuls ................. B29C 33/30
                                                          264/534
2016/0271867 A1* 9/2016 Miura ...................... B29C 51/10

FOREIGN PATENT DOCUMENTS

CN    104520092 A    4/2015
EP    3 031 595 A1   6/2016
(Continued)

OTHER PUBLICATIONS

International Search Report issued in PCT/JP2016/053115; dated May 17, 2016.
(Continued)

*Primary Examiner* — Vishal I Patel
(74) *Attorney, Agent, or Firm* — Studebaker & Brackett PC

(57) ABSTRACT

To reliably perform partial decoration forming by avoiding crush deformation of a hollow structure due to a change into a pressure-reduced state even in a case where part of the hollow structure is included in a partial decoration forming range of a formed plate material. A surrounding frame body (33) is brought into contact with an upper portion of a body to be coated to surround the decoration forming range, and the body to be coated is accommodated, and an upper space (A) in a sealed state and a lower space in a sealed state are formed. A surrounded space in a sealed state whose top and bottom are surrounded by a decorative film and the body to be coated in the decoration forming range is formed after the lower space and the upper space (A) in the sealed state are brought into a predetermined first pressure state where the (Continued)

pressures in the lower space and the upper space (A) are equal to each other. By instantaneously increasing the pressures in the lower space and the upper space (A) around the surrounded space from the pressure-reduced state to a second pressure state where the pressures are equal to each other while keeping the surrounded space at the first pressure state, partial decoration forming is performed on the decoration forming range in the surrounded space with the decorative film.

16 Claims, 24 Drawing Sheets

(51) Int. Cl.
```
B29C 51/12      (2006.01)
B29C 51/10      (2006.01)
B29C 51/30      (2006.01)
B29C 51/26      (2006.01)
B29C 65/48      (2006.01)
B29C 65/00      (2006.01)
B44C 1/10       (2006.01)
B29L 31/30      (2006.01)
```
(52) U.S. Cl.
CPC .......... B29C 51/262 (2013.01); B29C 51/303 (2013.01); B29C 65/48 (2013.01); B29C 66/474 (2013.01); B44C 1/105 (2013.01); B29C 2791/006 (2013.01); B29L 2031/3011 (2013.01)

(58) Field of Classification Search
CPC ....... B29C 66/474; B29C 63/02; B29C 51/12; B29C 2791/006; B44C 1/105; B29L 2031/3011

See application file for complete search history.

(56) References Cited

FOREIGN PATENT DOCUMENTS

| JP | H05-318572 A | 12/1993 |
| JP | H06-072353 A | 3/1994 |
| JP | 2005-262501 A | 9/2005 |
| JP | 2010-167773 A | 8/2010 |
| JP | 2010-167774 A | 8/2010 |
| JP | 2012-116094 A | 6/2012 |
| JP | 2014-177086 A | 9/2014 |
| JP | 2015-044285 A | 3/2015 |
| JP | 2015-196289 A | 11/2015 |

OTHER PUBLICATIONS

An Office Action mailed by the State Intellectual Property Office of the People's Republic of China dated Jul. 2, 2019, which corresponds to Chinese Patent Application No. 201680021251.5 and is related to U.S. Appl. No. 15/580,440; with English language translation.

An Office Action mailed by the Japanese Patent Office dated May 14, 2019, which corresponds to Japanese Patent Application No. 2017-554930 and is related to U.S. Appl. No. 15/580,440; with English language translation.

The extended European search report issued by the European Patent Office dated Feb. 22, 2019, which corresponds to European Patent Application No. 16872638.8-1014 and is related to U.S. Appl. No. 15/580,440.

\* cited by examiner (a)

(b)

(a)

(b)

(a)

(b)

(a)

(b)

(c)

(d)

(e)

(f)

PARTIAL DECORATION FORMING METHOD AND PARTIAL DECORATION FORMING APPARATUS

TECHNICAL FIELD

The present invention relates to a decoration forming method using a decorative sheet for decoration forming by coating a body to be coated with a decorative sheet having an adhesive layer on a lower surface thereof in a vacuum state, and a decoration forming apparatus used for the decoration forming method. The present invention particularly relates to a partial decoration forming method targeted at a relatively large body to be coated with a hollow structure, for performing decoration forming on a partial surface of the body to be coated, and a partial decoration forming apparatus used for the partial decoration forming method.

BACKGROUND ART

As a partial overlay method for partially decorating a large body to be coated such as a body of an automobile with a film, the following method is disclosed (Patent Document 1). In the method, an accommodating chamber having an upper portion thereof opened and an upper box having a lower portion thereof opened are vertically combined with a decorative film interposed therebetween to form a formed space in a sealed manner in which a box space and an accommodating space are vertically contiguously formed. Then, the decorative film is stuck through pressure reduction to a partial surface of the body to be coated W accommodated in the formed space by instantaneously generating a pressure difference between the upper and lower spaces in the formed space.

In addition, in a large body to be coated made of a formed plate material, a structure in which a back side of a formed surface is reinforced with a lower panel and a hollow structure is formed by an upper panel and the lower panel is often adopted. For example, as a front suspension member of an automobile, there is disclosed a hollow structure formed by an upper panel and a lower panel, and having a front arm attachment portion and a rear arm attachment portion on each lateral side portion (Patent Document 2). In the hollow structure, for example, a longitudinal wall extending substantially linearly from the front arm attachment portion to the rear arm attachment portion is provided. The rear arm attachment portion is formed of a portion obtained by extending the upper panel in the lateral direction, and a brace welded to the lower panel and projected in the lateral direction.

PRIOR ART DOCUMENTS

Patent Documents

Patent Document 1: Japanese Patent Laid-open Publication No. 2015-044285
Patent Document 2: Japanese Patent Laid-open Publication No. 06-72353

SUMMARY OF THE INVENTION

Problem to be Solved by the Invention

However, in a case where a part of the hollow structure is included in a partial decoration forming range of the formed plate material, upon decoration forming with the decorative film, the pressure on the back side of the formed plate material is reduced instantaneously and suddenly. Thus, the hollow structure is crushed and deformed. That is, in decoration forming using a decorative film, the accommodating space for accommodating the formed plate material in the decoration forming range and an upper box space above the accommodating space with the decorative film as a boundary are in an equal-pressure state. This equal-pressure state suddenly changes into a pressure-reduced state where the pressure inside the accommodating space is greatly lower than the pressure in the box space. Upon this sudden state change, the accommodating space is instantaneously brought into the pressure-reduced state. Therefore, in a case where a body to be coated having a hollow structure is accommodated in the accommodating space, the hollow structure is crushed due to a change into the pressure-reduced state or the like. In this manner, the hollow structure receives an influence such as deformation due to pressure reduction.

In order to avoid the influence caused by the pressure reduction, the following measure is also considered. The measure is to form a bypass air passage between the hollow structure in the accommodating space and the upper box space, and to partially keep only the pressure inside the hollow structure equal to the pressure in the upper box space. In order to partially keep the equal-pressure state only inside the hollow structure by such a bypass air passage, a structure is required which keeps the hollow structure in an airtight state and causes only the pressure in the hollow structure to be equal to the pressure in the upper box space.

However, since the hollow structure is formed by spot-welding or block-welding the lower panel from the back side of the upper panel of the body to be coated made of the formed plate material, part of the lower panel constituting the hollow structure often has a hole portion such a lightening hole, or a gap is often formed between the part of the lower panel and the upper panel. Therefore, it is extremely difficult in terms of structure to keep the hollow structure in an airtight state.

Therefore, an object of the present invention is to provide a partial decoration forming method and a partial decoration forming apparatus, capable of reliably performing partial decoration forming by avoiding crush deformation of a hollow structure due to a change into a pressure-reduced state even in a case where part of the hollow structure is included in a partial decoration forming range.

Solutions to the Problems

In order to solve the above problem, the following measures are taken.
(1) A partial decoration forming method using a decorative film is for performing partial decoration forming on a body to be coated by setting a surface in a predetermined range close to one end portion of the body to be coated as a decoration forming range, and sticking the decorative film to the decoration forming range using a predetermined partial decoration forming apparatus, the predetermined partial decoration forming apparatus including:
a lower box which has a lower space opened at an upper end, and accommodates in the lower space the body to be coated with the decoration forming range directed upward;
an upper box which has an upper space opened at a lower end, and can contiguously form the upper space above the lower space in a sealed manner with the decorative film interposed between the lower opening of the upper box and the upper opening of the lower box opposed to each other;

a surrounding frame body which is arranged to surround an outer edge of the decoration forming range of the body to be coated and to be in contact with an upper portion of the body to be coated;

a holding frame which has a frame hole larger than the planar projected area of the decoration forming range and which can hold a peripheral portion of the decorative film expanded in a lateral direction and can stretch the decorative film in the frame hole; and a pressure control device which controls pressures in the upper space and in the lower space in a state where the upper box is arranged on the lower box in a sealed manner, the method including the following steps in order using the predetermined partial decoration forming apparatus.

That is, the method includes:

an accommodating step of bringing the surrounding frame body into contact with the upper portion of the body to be coated to surround the decoration forming range and accommodating the body to be coated and the surrounding frame body in the lower box;

a film setting step of expanding the decorative film larger than the planar projected area of the decoration forming range in the lateral direction above the upper opening or below the lower opening to hold the peripheral portion of the decorative film with the holding frame;

a first sealing step of forming the upper space in a sealed state and a lower space in a sealed state by vertically contiguously forming the upper space and the lower space with the decorative film interposed between the lower opening of the upper box and the upper opening of the lower box opposed to each other;

a first pressure adjusting step of causing the pressure control device to bring the lower space in the sealed state and the upper space in the sealed state into a predetermined first pressure state where the pressure in the lower space and the pressure in the upper space are equal to each other;

a second sealing step of bringing the decorative film or the holding frame on the periphery of the decorative film and the surrounding frame body into contact with each other in the lower space in the sealed state to form a surrounded space in a sealed state at frame inside of the surrounding frame body; and a second pressure adjusting step of causing the pressure control device to instantaneously increase the pressure in the lower space in the sealed state excluding the surrounded space in the sealed state and the pressure in the upper space in the sealed state from the pressure-reduced state to a second pressure state where the pressures are equal to each other, while keeping inside of the surrounded space in the sealed state at the first pressure state, and partial decoration forming is performed on the decoration forming range in the surrounded space with the decorative film in the second pressure adjusting step.

According to the second sealing step, by surrounding only a surface to be decorated in the decoration forming range with the surrounding frame, the surrounded space in a sealed state in which the decorative film is stretched over the upper portion thereof can be formed in the lower space in a sealed state controlled in the first pressure state. According to the second pressure adjusting step, by instantaneously increasing the pressure in the upper space while keeping the surrounded space in the sealed state at the first pressure state, decoration forming can be instantaneously performed on the decoration forming range by the pressure difference between the upper space and the surrounded space. In addition, according to the second pressure adjusting step, by instantaneously increasing the pressures in the upper space and in the lower space in a state where the pressures remain equal to each other, an influence such as crushing due to sudden pressure reduction is not generated in the lower space excluding the surrounded space.

As described, as a third sealed space between the upper space and the lower space, the surrounded space is formed in the lower space. Therefore, even in a case where an indentation, a hole, or a gap exists on the back side of the surface to be decorated of the body to be coated, an influence caused by the sudden pressure difference in the second pressure step is avoided.

Even in a case where the body to be coated is supported by a receiving jig or the like, there is no need to provide a pressure guiding circuit for making the pressure on a lower-surface side of the body to be coated uniform. Therefore, regardless of the performance of the body to be coated of retaining the form upon pressure reduction, even if a body to be coated has a complicated shape, it is possible to reliably perform partial decoration forming on the body to be coated with a relatively simple structure. For example, even in a case where there is a fine pit or hole, a welded portion, a bonded portion, or an internal space on the back side of the range, formation of the surrounded space in the sealed state in a partial decoration forming range of a surface to be coated prevents a formed portion of the body to be coated from being deformed or broken, and prevents pressure leakage.

(2) It is preferable that the first pressure step is a step of simultaneously sucking the lower space in the sealed state excluding the surrounded space and the upper space in the sealed state to bring the spaces into the first pressure state where the pressure is lower than an atmospheric pressure, and the second pressure adjusting step is a step of simultaneously releasing the lower space in the sealed state excluding the surrounded space and the upper space in the sealed state, brought into the first pressure state in the first pressure adjusting step, to the atmospheric pressure, and bringing the above spaces into the second pressure state where the pressure is equal to the atmospheric pressure.

In the above steps, it is enough to include as the pressure control device at least a communicating pipe communicating with the upper box and the lower box, and a pressure reducing pump connected to the communicating pipe. Reliable pressure control can be performed with a simple mechanism.

(3) It is preferable that the first sealing step is a step of holding and fixing an edge portion of the decorative film expanded in the lateral direction by the holding frame which is vertically movable, and accommodating the holding frame holding the decorative film in the lower space or the upper space by contiguously forming the upper space and the lower space, and the second sealing step is a step of lowering the holding frame to bring a contact upper surface of the body to be coated including the decoration forming range or a contact surface of the surrounding frame body arranged on the body to be coated into contact with an opposed contact surface of the holding frame, and forming the surrounded space surrounded by a contact upper surface of the body to be coated in the decoration forming range, a frame inner surface of the surrounding frame body, and the lower surface of the decorative film.

According to the first sealing step, the holding frame which is vertically movable is arranged in advance in the vicinity of an upper portion of the upper opening or in the vicinity of a lower portion of the lower opening, and the decorative film held by the holding frame is accommodated in the upper space or the lower space vertically contiguously formed. In this state, no surrounded space is formed in the lower space, and the entire lower space is adjusted to the first pressure state in the subsequent first pressure adjusting step. Then, in the subsequent second sealing step, the surrounded space which is sealed in the first pressure state is formed in the lower space also sealed in the first pressure state. The surrounded space in the first pressure state is easily formed by vertically moving the holding frame in the lower space in the sealed state and bringing the holding frame into contact until airtightness is maintained. In addition, by using the holding frame which is vertically movable, it is possible to easily and reliably form the surrounded space in a sealed manner without greatly moving the body to be coated upward.

In Example 1 to be described later, by rotating a connecting rod and lowering a holding frame until the holding frame comes into contact with a surrounding frame body, an upper contact surface of the surrounding frame body arranged on a body to be coated and an opposed contact surface on the lower portion of the holding frame are brought into contact with each other. The surrounding frame body is in contact with and arranged on the body to be coated in advance outside a decoration forming range in plan view, and a decorative film is stretched and set in advance at frame inside of the holding frame. Therefore, the surrounded space surrounded by the decoration forming range of the body to be coated, a frame inner surface of the surrounding frame body, and the decorative film is formed in a sealed manner when the surrounding frame body and the holding frame are opposed to and are brought into contact with each other (FIGS. 9(a) and 9(b)).

In addition, in Example 2 to be described later, by lowering a regulating angle so as to lower a holding frame brought into contact with a lower portion of the regulating angle close to a frame bottom surface of a base frame body, a contact surface of a body to be coated including a decoration forming range and a decorative film are brought into contact with each other. By lowering the holding frame, a surrounded space surrounded by the decoration forming range of the body to be coated and the decorative film is formed in a sealed manner (FIG. 13(e)).

(4) It is preferable that the surrounding frame body includes an elastic material which can be elastically deformed by pressure contact in at least one of an arrangement contact portion on the body to be coated and a contact portion which is to be brought into contact with the opposed contact surface of the holding frame, and the second sealing step is a step of bringing the contact surface of the body to be coated including the decoration forming range or the contact surface of the surrounding frame body arranged on the body to be coated close to and pressure-contact with the opposed contact surface of the holding frame, and airtightly forming the surrounded space surrounded by the upper surface of the body to be coated in the decoration forming range, the frame inner surface of the surrounding frame body, and the lower surface of the decorative film.

According to the second sealing step using the surrounding frame body, it is possible to more reliably form the surrounded space in an airtight manner regardless of the contact state on the holding frame which is lowered or an arrangement and contact state on the body to be coated. Note that in the examples to be described later, the entire surrounding frame body is made of an elastic material that maintains airtightness from a portion in contact with the outside. As another mode, an entire outer peripheral portion of a surrounding frame body may be covered with an elastic material that maintains airtightness from a portion in contact with the outside.

For example, in Example 1 to be described later, by rotating the connecting rod so as to lower the holding frame close to a fastening base body, the contact surface of the surrounding frame body arranged on the body to be coated is brought close to and into pressure-contact with the opposed contact surface of the holding frame, and the contact surface of the surrounding frame body arranged on the body to be coated is brought close to and into pressure-contact with the opposed contact surface of the body to be coated.

(5) It is preferable that the body to be coated has an opening under the surface having the decoration forming range, the predetermined partial decoration forming apparatus further includes:

a fastening base body which is disposed to be locked to an opening of the body to be coated and can partially project from the outer edge of the decoration forming range to the outside of the body to be coated in plan view; and a connecting rod which vertically connects the fastening base body and the holding frame and can shorten the vertical connection distance between the fastening base body and the holding frame, the accommodating step is a step of accommodating the body to be coated in the lower box in a state where the fastening base body is locked to and arranged at the opening of the body to be coated, the film setting step is a step of arranging the holding frame above the fastening base body and above the surrounding frame body, and vertically connecting the holding frame and the fastening base body by the connecting rod, and in the second sealing step, the vertical connection distance between the holding frame and the fastening base body vertically connected is shortened, the distance between the fastening base body and the holding frame is shortened, the surrounding frame body is vertically compressed by the fastening base body and the holding frame, and the surrounded space surrounded by the upper surface of the body to be coated in the decoration forming range, the frame inner surface of the surrounding frame body, and the decorative film is formed in a sealed manner.

With the above configuration, the surrounding frame body and the part of the body to be coated in the decoration forming range, surrounded by the surrounding frame body, are sandwiched between the fastening base body and the holding frame. Therefore, the surrounded space can be easily and reliably formed in a sealed manner.

For example, in Example 1 to be described later, by rotating the connecting rod so as to lower the holding frame close to the fastening base body, the distance between the fastening base body under the decoration forming range and the holding frame above the decoration forming range is shortened, the surrounding frame body is vertically compressed by the fastening base body and the holding frame, and the surrounded space surrounded by the decoration forming range, the frame inner surface of the surrounding frame body, and the decorative film is formed in a sealed manner.

(6) A partial decoration forming method using a decorative film is for performing partial decoration forming on a body to be coated by setting a surface in a predetermined range close to one end portion of the body to be coated as a decoration forming range, and sticking the decorative film to the partial decoration forming range using a predetermined partial decoration forming apparatus, the predetermined partial decoration forming apparatus including:

a lower box which has a lower partitioned space opened at an upper end, and accommodates in the lower partitioned space the body to be coated with the decoration forming range directed upward;

an upper box which has an upper space opened at a lower end, contiguously forms the upper space above the lower partitioned space in a sealed manner with the decorative film interposed between a lower opening of the upper box and the upper opening of the lower box opposed to each other;

a base frame body which has a lower partitioned space opened at an upper end and is disposed in the lower box, and can partition an upper portion of the lower partitioned space of the lower box, which is the lower partitioned space of the base frame body;

a holding frame which has a frame hole larger than the planar projected area of the decoration forming range and which can hold a peripheral portion of the decorative film expanded in a lateral direction and can stretch the decorative film in the frame hole; and a pressure control device which controls pressures in the upper space and in the lower partitioned space in a state where the upper box is arranged on the lower box in a sealed manner, the method using the predetermined partial decoration forming apparatus, and including:

a partitioning and accommodating step of accommodating the body to be coated and disposing the base frame body in the lower box to partition the upper portion of the lower partitioned space of the lower box, and accommodating and supporting at least part of the body to be coated including the decoration forming range in the lower partitioned space which is partitioned;

a film setting step of expanding the decorative film larger than the planar projected area of the decoration forming range in the lateral direction above the upper opening or below the lower opening to hold the peripheral portion of the decorative film with the holding frame;

a first sealing step of forming the upper space in a sealed state and the lower partitioned space of the lower box in a sealed state by vertically contiguously forming the upper space and the lower partitioned space of the lower box with the decorative film interposed between the lower opening of the upper box and the upper opening of the lower box opposed to each other;

a first pressure adjusting step of causing the pressure control device to bring the lower partitioned space of the lower box in the sealed state and the upper space in the sealed state into a predetermined first pressure state where the pressure in the lower partitioned space of the lower box and the pressure in the upper space are equal to each other;

a second sealing step of bringing the decorative film or the holding frame on the periphery of the decorative film and the base frame body into contact with each other in the lower partitioned space of the lower box in the sealed state to form a surrounded space in the sealed state at frame inside of the base frame body; and a second pressure adjusting step of causing the pressure control device to instantaneously increase the pressure in the lower partitioned space of the lower box in the sealed state excluding the surrounded space in a sealed state and the pressure in the upper space in the sealed state from the pressure-reduced state to a second pressure state where the pressures are equal to each other, while keeping inside of the surrounded space in the sealed state at the first pressure state, and partial decoration forming is performed on the decoration forming range in the surrounded space with the decorative film in the second pressure adjusting step.

According to the second sealing step, by surrounding only a surface to be decorated in the decoration forming range with the surrounding frame, the surrounded space in the sealed state in which the decorative film is stretched over the upper portion thereof can be formed in the lower partitioned space in the sealed state controlled in the first pressure state. According to the second pressure adjusting step, by instantaneously increasing the pressure in the upper space while keeping the surrounded space in the sealed state at the first pressure state, decoration forming can be instantaneously performed on the decoration forming range by the pressure difference between the upper space and the surrounded space. In addition, according to the second pressure adjusting step, by instantaneously increasing the pressures in the upper space and in the lower partitioned space in a state where the pressures remain equal to each other, an influence due to pressure difference is not generated in the lower partitioned space excluding the surrounded space.

As described, as a third sealed space between the upper space and the lower partitioned space, the surrounded space is formed in the lower partitioned space. Therefore, even in a case where an indentation, a hole, or a gap exists on the back side of the surface to be decorated of the body to be coated, an influence caused by the sudden pressure difference in the second pressure step is avoided.

Even in a case where the body to be coated is supported by a receiving jig or the like, there is no need to provide a pressure guiding circuit for making the pressure on a lower-surface side of the body to be coated uniform. Therefore, regardless of the performance of the body to be coated of retaining the form upon pressure reduction, even if a body to be coated has a complicated shape, it is possible to reliably perform partial decoration forming on the body to be coated with a relatively simple structure. For example, even in a case where there is a fine pit or hole, a welded portion, a bonded portion, or an internal space on the back side of the range, formation of the surrounded space in the sealed state in a partial decoration forming range of a surface to be coated prevents a formed portion of the body to be coated from being deformed or broken, and prevents pressure leakage.

(7) A partial decoration forming apparatus according to the present invention is a partial decoration forming apparatus for performing partial decoration forming on a body to be coated by setting a surface in a predetermined range close to one end portion of the body to be coated as a decoration forming range, and sticking a decorative film to the partial decoration forming range, the apparatus including:

a lower box which has a lower space opened at an upper end, and accommodates in the lower space the body to be coated with the decoration forming range directed upward;

an upper box which has an upper space opened at a lower end, and can contiguously form the upper space above the lower space in a sealed manner with the decorative film interposed between the lower opening of the upper box and the upper opening of the lower box opposed to each other;

a surrounding frame body which is arranged to surround an outer edge of the decoration forming range of the body to be coated and to be in contact with an upper portion of the body to be coated;

a holding frame which has a frame hole larger than the planar projected area of the decoration forming range and which can hold a peripheral portion of the decorative film expanded in a lateral direction and can stretch the decorative film in the frame hole; and a pressure control device which controls pressures in the upper space and in the lower space in a state where the upper box is arranged on the lower box in a sealed manner.

The lower box can accommodate the body to be coated and the surrounding frame body in the lower space in a state of bringing the surrounding frame body into contact with the upper portion of the body to be coated to surround the decoration forming range.

The holding frame can hold the peripheral portion of the decorative film in the frame hole in a state of expanding the decorative film larger than the planar projected area of the decoration forming range in the lateral direction above the upper opening or below the lower opening.

The lower box and the upper box can be both in a sealed state by vertically contiguously forming the upper space and the lower space with the holding frame on which the decorative film is stretched interposed between the lower opening and the upper opening opposed to each other.

The holding frame which holds and stretches the decorative film and the surrounding frame body are brought into contact with each other in the lower space in a sealed manner so as to form the surrounded space in a sealed state at frame inside of the surrounding frame body with the decorative film held and stretched by the holding frame as an upper edge of the surrounded space and the body to be coated in the decoration forming range as a lower edge of the surrounded space.

The pressure control device can bring the lower space in the sealed state and the upper space in the sealed state into a predetermined first pressure state where the pressure in the lower space and the pressure in the upper space are equal to each other, instantaneously increase the pressure in the lower space in the sealed state excluding the surrounded space in a sealed state and the pressure in the upper space in the sealed state from the pressure-reduced state to a second pressure state where the pressures are equal to each other, while keeping inside of the surrounded space in the sealed state at the first pressure state.

Effects of the Invention

According to the present invention, with the above configuration, the surrounded space surrounded by the decorative film and the decoration forming range of the body to be coated is formed as the third sealed space between the upper space and the lower space, and a pressure difference is generated between the surrounded space and the upper space and the lower space around the surrounded space to perform decoration forming. Thus, even in a case where an indentation, a hole, or a gap exists on the back side of the surface to be decorated of the body to be coated, an influence caused by the sudden pressure difference in the second pressure step is avoided. Even in a case where the body to be coated is supported by the receiving jig or the like, there is no need to provide the pressure guiding circuit for making the pressure on the lower-surface side of the body to be coated uniform in the receiving jig or the like. Therefore, even if a body to be coated has a complicated shape, it is possible to reliably perform partial decoration forming on the body to be coated with a relatively simple structure. Therefore, for example, even in a case where there is a fine pit or hole, a welded portion, a bonded portion, or an internal space on the back side of the range, formation of the surrounded space in the sealed state in the partial decoration forming range of the surface to be coated prevents the formed portion of the body to be coated from being deformed or broken, prevents pressure leakage, and enables reliable decoration forming due to pressure difference.

EMBODIMENTS OF THE INVENTION

Figure 1:
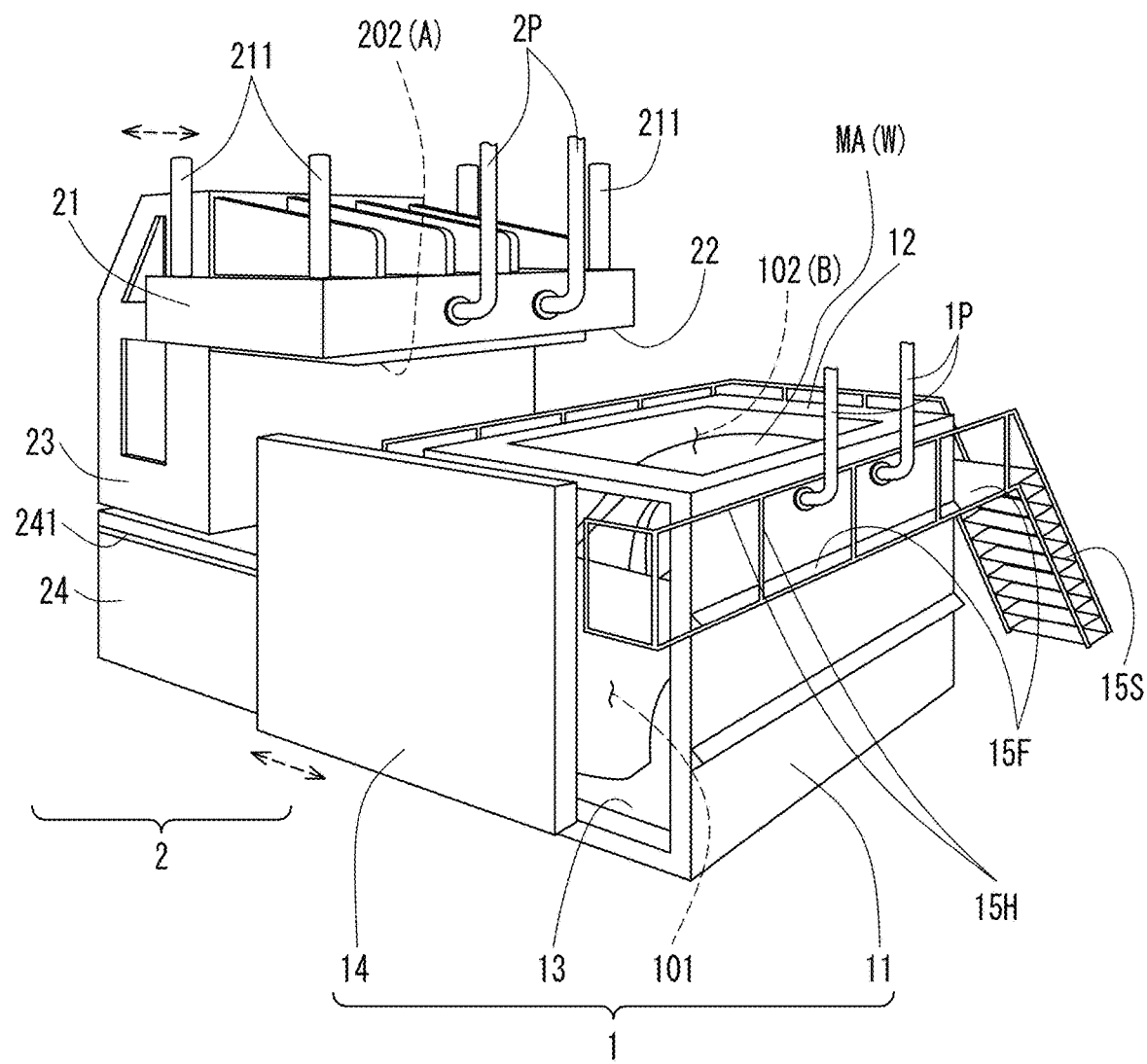
FIG. 1 is a perspective external view of a partial decoration forming apparatus in Example 1 of the present invention.

Hereinafter, best modes of the present invention will be described below with reference to explanatory views illustrated as Examples 1, 2 and 3. Note that in the following description, numerals and alphabets in parentheses are reference signs assigned for reference to the drawings for the sake of convenience, and are not intended to specify the name of a configuration or to limit the content to the examples.

In any of the examples, a partial decoration forming method according to the present invention is a partial decoration forming method using a decorative film for performing partial decoration forming on a body to be coated by setting a surface in a predetermined range close to one end portion of the body to be coated as a decoration forming range, and sticking the decorative film to the partial decoration forming range using a predetermined partial decoration forming apparatus. In particular, a partial decoration forming method according to the present invention is a partial decoration forming method for setting a body to be coated having a hollow structure in part of a formed plate material in a decoration forming range as a target for partial decoration forming, particularly setting not the entire surface of the body to be coated but a predetermined range which is part of the surface as a partial decoration forming range, and performing decoration forming only on the partial decoration forming range. Particularly, as the body to be coated, it is possible to use a body to be coated having an opening under the surface having the decoration forming range as in Example 1 to be described later.

The predetermined partial decoration forming apparatus according to the present invention at least includes:

a lower box which has a lower space opened at an upper end, and accommodates in the lower space a body to be coated with a decoration forming range directed upward;

an upper box which has an upper space opened at a lower end, and can contiguously form the upper space above the lower space in a sealed manner with the decorative film interposed between the lower opening of the upper box and the upper opening of the lower box opposed to each other;

a holding frame which has a frame hole larger than the planar projected area of the decoration forming range and which can hold a peripheral portion of the decorative film expanded in a lateral direction and can stretch the decorative film in the frame hole; and a pressure control device which controls pressures in the upper space and in the lower space in a state where the upper box is arranged on the lower box in a sealed manner.

In the partial decoration forming method according to the present invention, at least the following steps are performed using the predetermined partial decoration forming apparatus.

That is, the method includes:

an accommodating step of bringing the surrounding frame body into contact with the upper portion of the body to be coated to surround the decoration forming range and accommodating the body to be coated in the lower box;

a film setting step of expanding the decorative film larger than the planar projected area of the decoration forming range in the lateral direction above the upper opening or below the lower opening to hold the peripheral portion of the decorative film with the holding frame;

a first sealing step of forming the upper space in the sealed state and a lower space in the sealed state by vertically contiguously forming the upper space and the lower space with the decorative film interposed between the lower opening of the upper box and the upper opening of the lower box opposed to each other;

a first pressure adjusting step of causing the pressure control device to bring the lower space in the sealed state and the upper space in the sealed state into a predetermined first pressure state where the pressure in the lower space and the pressure in the upper space are equal to each other;

a second sealing step of bringing the decorative film or the holding frame on the periphery of the decorative film and the body to be coated into contact with each other in the lower space in the sealed state to form a surrounded space in the sealed state whose top and bottom are surrounded by the decoration forming range on the body to be coated and the decorative film which covers the decoration forming range from above; and a second pressure adjusting step of causing the pressure control device to instantaneously increase the pressure in the lower space in the sealed state excluding the surrounded space in the sealed state and the pressure in the upper space in the sealed state from the pressure-reduced state to a second pressure state where the pressures are equal to each other, while keeping inside of the surrounded space in the sealed state at the first pressure state.

According to the decoration forming method of the present invention, the surrounded space in the sealed state is formed in the lower space in the second sealing step, and only the surrounded space is changed into the pressure-reduced state where the pressure is lower than the pressures in the upper space and in the lower space around the surrounded space in the second pressure adjusting step. Therefore, partial decoration forming is performed on the decoration forming range on a lower edge of the surrounded space surrounded in a sealed manner with the decorative film in the second pressure adjusting step. The surrounded space, which is a third sealed space in addition to the lower space of the sealed space and the upper space of the sealed space, is formed, and only the surrounded space is instantaneously changed into the pressure-reduced state. Therefore, even if a hollow structure is included in the lower portion of the formed plate material in the decoration forming range, the hollow structure is included in the lower space, and it is possible to avoid an influence such as crushing due to pressure reduction of the hollow structure caused by a change into the pressure-reduced state.

As a means for forming the hollow space, in Example 1, there are provided: a surrounding frame body surrounding the outer periphery of the decoration forming range and arranged on the body to be coated; and a vertically movable type holding frame which lowers from above the surrounding frame body to come in contact with the surrounding frame body while holding the decorative film stretched in the lateral direction, that is, in a substantially horizontal direction. In addition, as a means for forming the hollow space, in Example 2, there are provided: a base frame body surrounding an outer periphery of the decoration forming range and partitioning an upper half portion of the lower space; and a vertically movable type holding frame which lowers from above the body to be coated to come in contact with the body to be coated while holding the decorative film stretched in the lateral direction, that is, in a substantially horizontal direction. Note that in the structure of Example 2, a surrounding frame body surrounding the outer periphery of the decoration forming range and arranged on the body to be coated may be further provided. Hereinafter, configurations of the examples will be described in detail.

EXAMPLE 1

A partial decoration forming apparatus in Example 1 illustrated in FIGS. 1 to 10(b) is a partial decoration forming apparatus for performing partial decoration forming only on a decoration forming range (MA) of a body to be coated (W) by setting a surface in a predetermined range close to one end portion of the body to be coated (W) as the decoration forming range (MA), and sticking a decorative film (F) to the decoration forming range (MA), the apparatus including:

a lower box (1) which has a lower space opened at an upper end, and accommodates in the lower space the body to be coated (W) with the decoration forming range (MA) directed upward;

an upper box (2) which has an upper space (A) opened at a lower end, and can contiguously form the upper space (A) above the lower space in a sealed manner with the decorative film (F) interposed between the lower opening of the upper box (2) and the upper opening of the lower box (1) opposed to each other;

a holding frame (32) which has a frame hole (330) larger than the planar projected area of the decoration forming range (MA) and which can hold a peripheral portion of the decorative film (F) expanded in a lateral direction and can stretch the decorative film (F) in the frame hole (330); and a pressure control device which controls pressures in the upper space (A) and in the lower space in a state where the upper box (2) is arranged on the lower box (1) in a sealed manner.

In addition to these structures, the partial decoration forming apparatus further includes:

a surrounding frame body (33) which is arranged to surround an outer edge of the decoration forming range (MA) of the body to be coated (W) and to be in contact with an upper portion of the body to be coated (W);

a fastening base body (3) which is disposed to be locked to an opening (WH1) of the body to be coated (W) and partially projects from the outer edge of the decoration forming range (MA) to the outside of the body to be coated (W) in plan view; and a connecting rod vertically connecting the fastening base body (3) and the holding frame (32) and capable of shortening the vertical connection distance between the fastening base body (3) and the holding frame (32).

The lower box (1) and the upper box (2) can be both in a sealed state by vertically contiguously forming the upper space (A) and the lower space with the holding frame (32) on which the decorative film (F) is stretched interposed between the lower opening and the upper opening opposed to each other.

(Lower Box (1))

Figure 2:
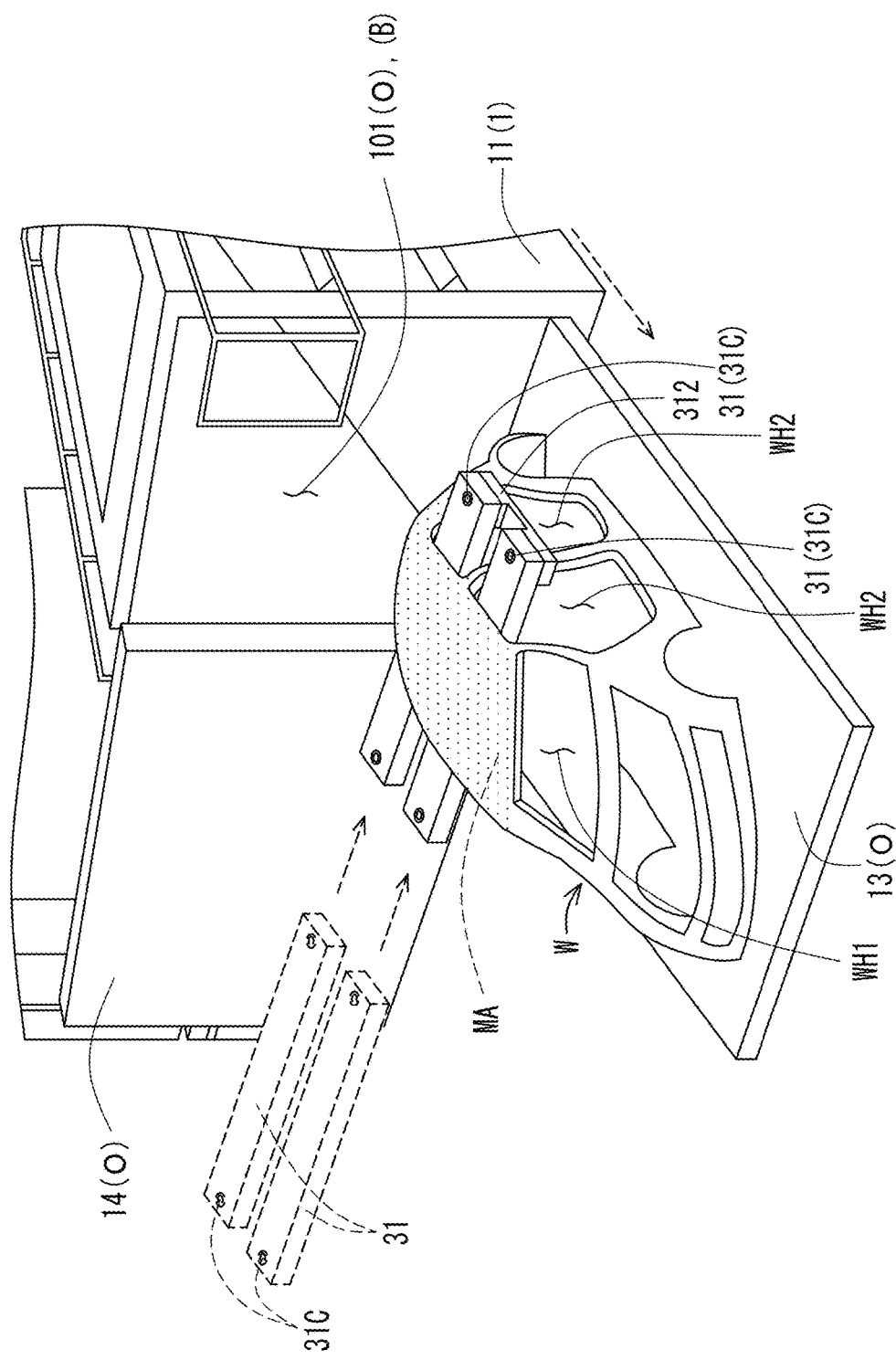
FIG. 2 is a partial explanatory perspective view illustrating a pre-accommodating step of the partial decoration forming apparatus in Example 1.
Figure 3:
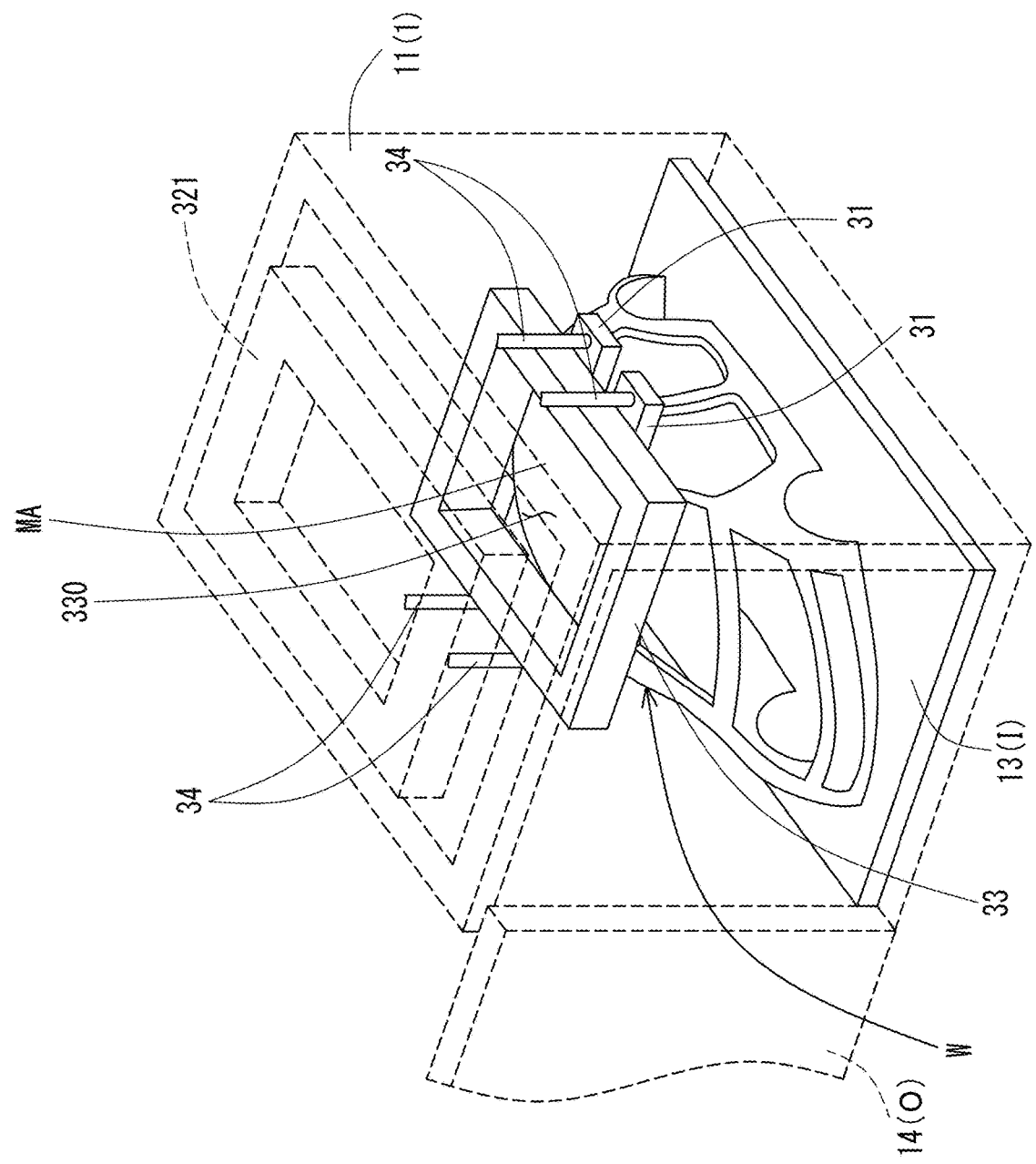
FIG. 3 is a partial explanatory perspective view illustrating an accommodating step of the partial decoration forming apparatus in Example 1.
Figure 4:
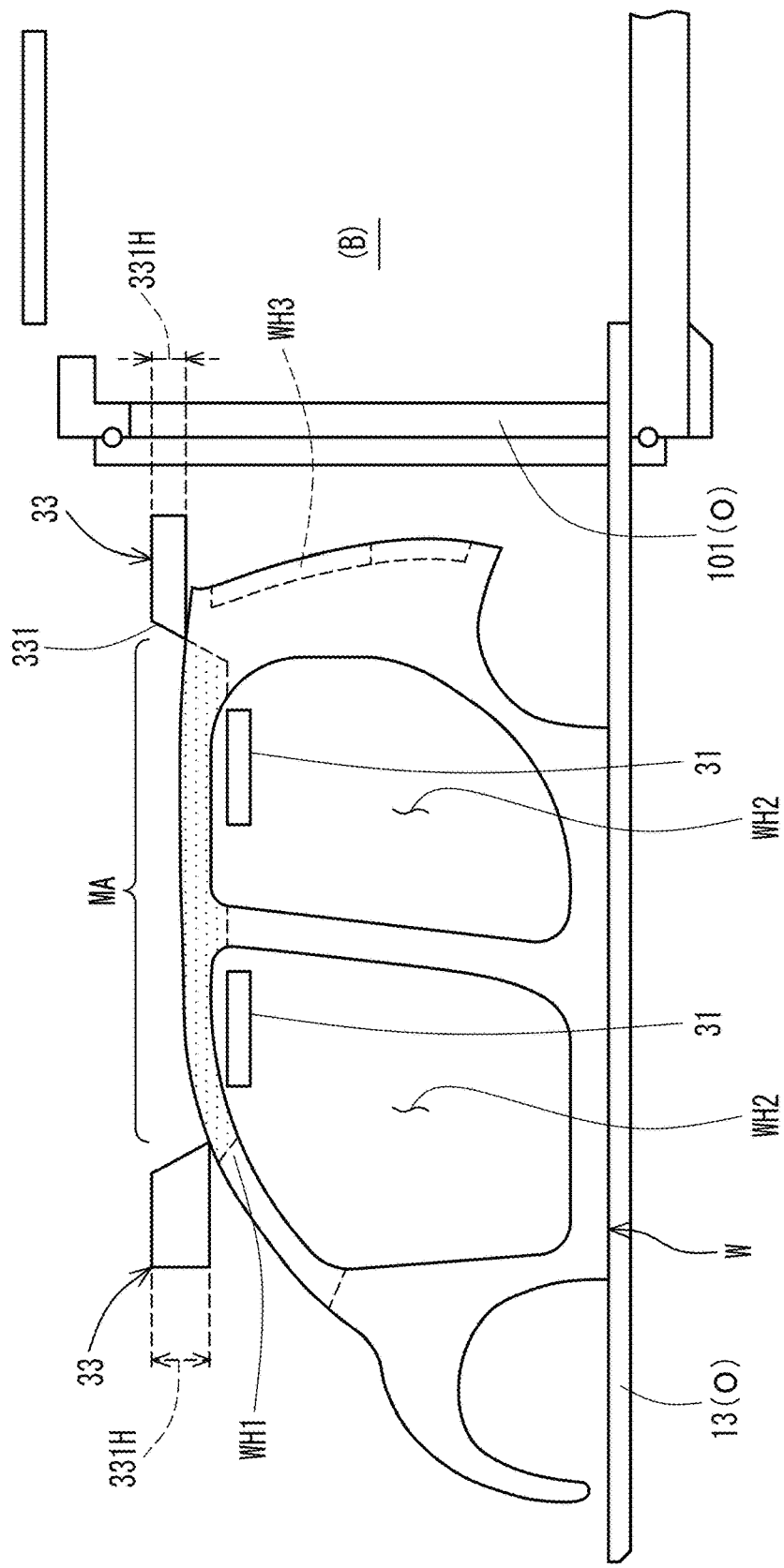
FIG. 4 is a longitudinal cross-sectional explanatory view illustrating a state immediately before the accommodating step of the partial decoration forming apparatus in Example 1.
Figure 5:
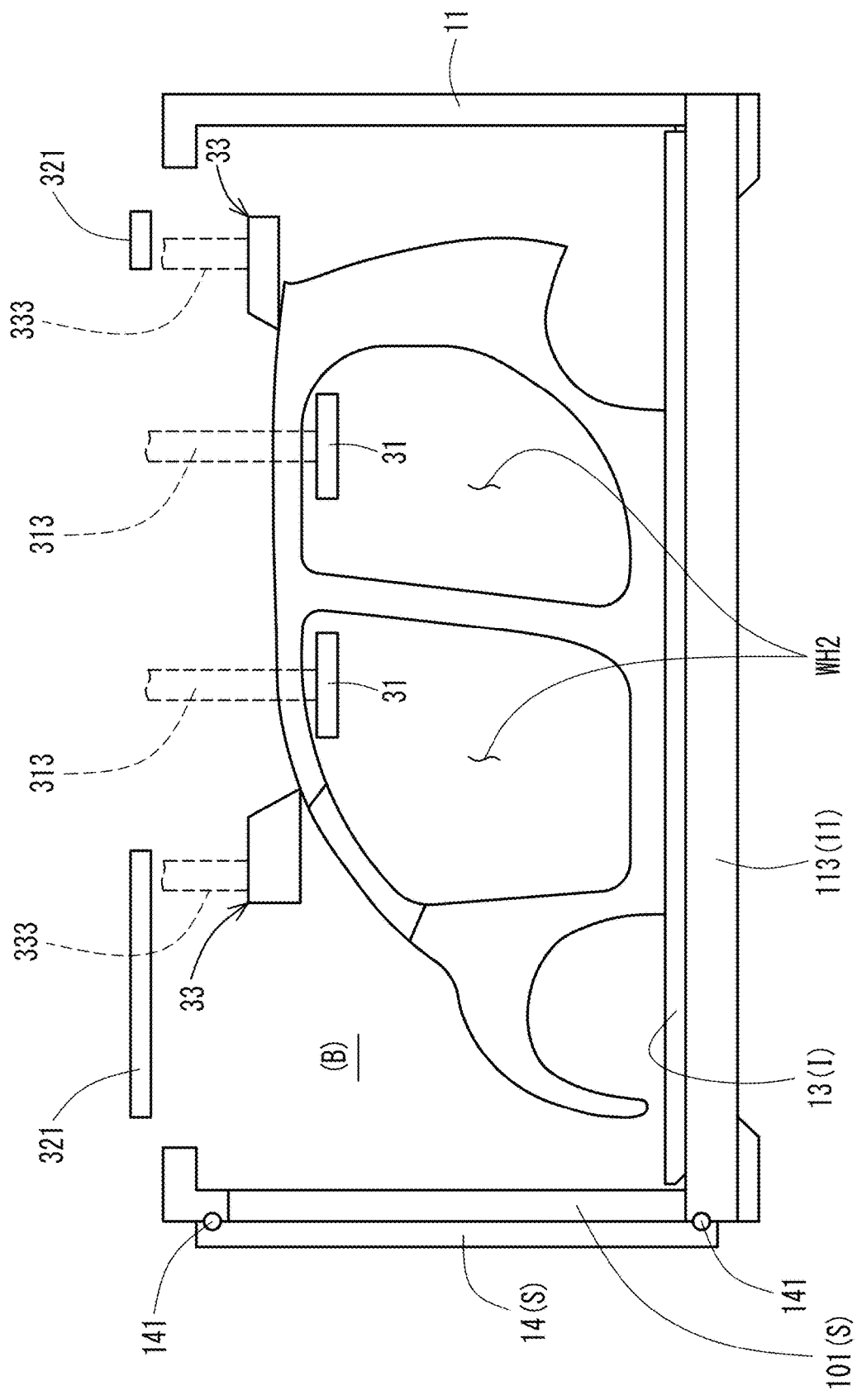
FIG. 5 is a longitudinal cross-sectional explanatory view illustrating a state immediately after the accommodating step of the partial decoration forming apparatus in Example 1.

As illustrated in FIGS. 1 to 3 or FIGS. 4 to 5, the lower box (1) is a box-shaped hexahedron having a lower space (B) that can accommodate the entire large body to be coated (W). A front opening (101) and an upper opening (102) are formed on two surfaces, that is, the front surface and the upper surface of the box-shaped hexahedron, respectively. In addition, a front door (14) capable of blocking the front opening (101) in a sealed manner, and a bottom plate (13) accommodated in the bottom and capable of being drawn out are slidably attached. In addition, a working scaffold (15F) surrounding the periphery of the box-shaped hexahedron, and a flight of stairs (15S) connected to the working scaffold (15F) are provided. In an opened state (O), the front door (14) slides to a front surface of a slide base (24) fixed to one side of the lower box (1) (FIGS. 2 to 4). In a closed state (S), the front door (14) slides to the front surface of the lower box (1) so as to close the entire front opening (101) (FIG. 5). Note that the sliding direction of this slide movement is regulated by a door rail (241) formed horizontally on the front surface of the slide base (24). In the closed state (S), the front opening (101) is blocked in a sealed state by a gasket (141).

The bottom plate (13) is slidably supported such that the bottom plate (13) can be drawn further forward than the front opening (101) when the front opening (101) is in the opened state (O). After the body to be coated (W) is placed on the bottom plate (13) in a drawn-out state (O), the bottom plate (13) causes the body to be coated (W) to be accommodated in the lower box (1) in a stored state (I) (FIGS. 2 to 3, FIGS. 4 to 5). Communicating pipes (1P) communicating with the pressure control device, not illustrated, are connected to a side of the lower box (1).

In the partial decoration forming method in the present example, at least the following steps are performed using the predetermined partial decoration forming apparatus (FIGS. 2 to 10(b)).

Figure 6:
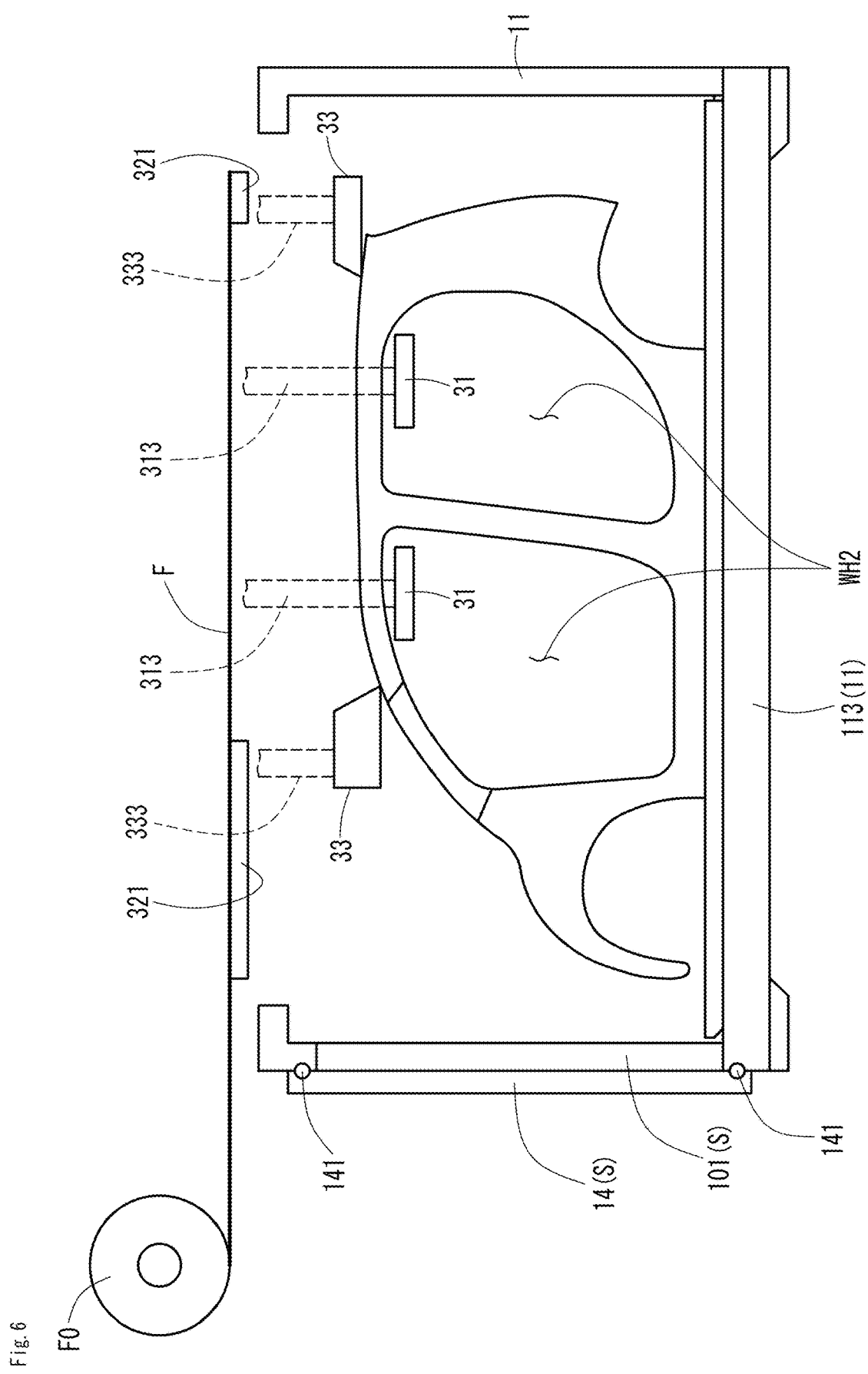
FIG. 6 is a longitudinal cross-sectional explanatory view illustrating a state in the middle of a film setting step of the partial decoration forming apparatus in Example 1.
Figure 7:
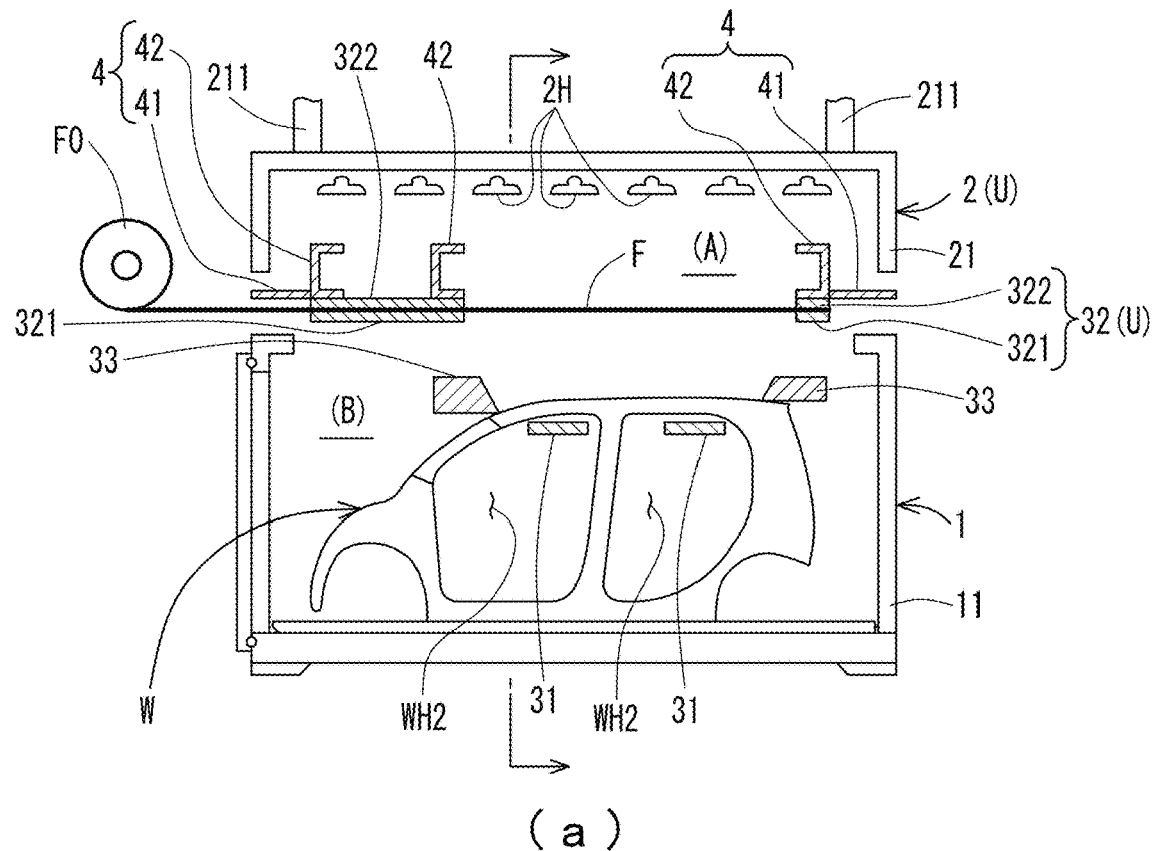
FIGS. 7(a) and 7(b) are longitudinal cross-sectional explanatory views illustrating a state immediately after the accommodating step of the partial decoration forming apparatus in Example 1.
Figure 7:
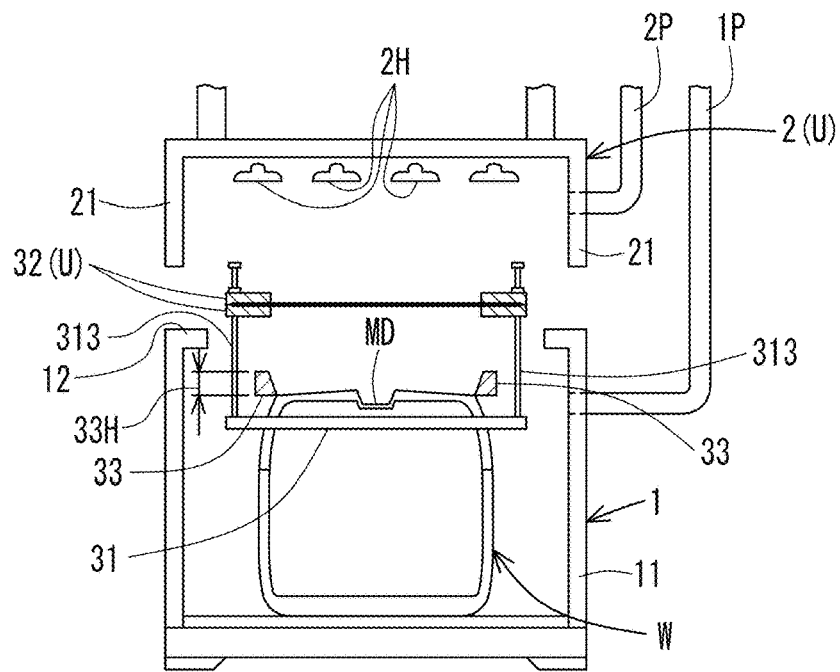
Figure 8:
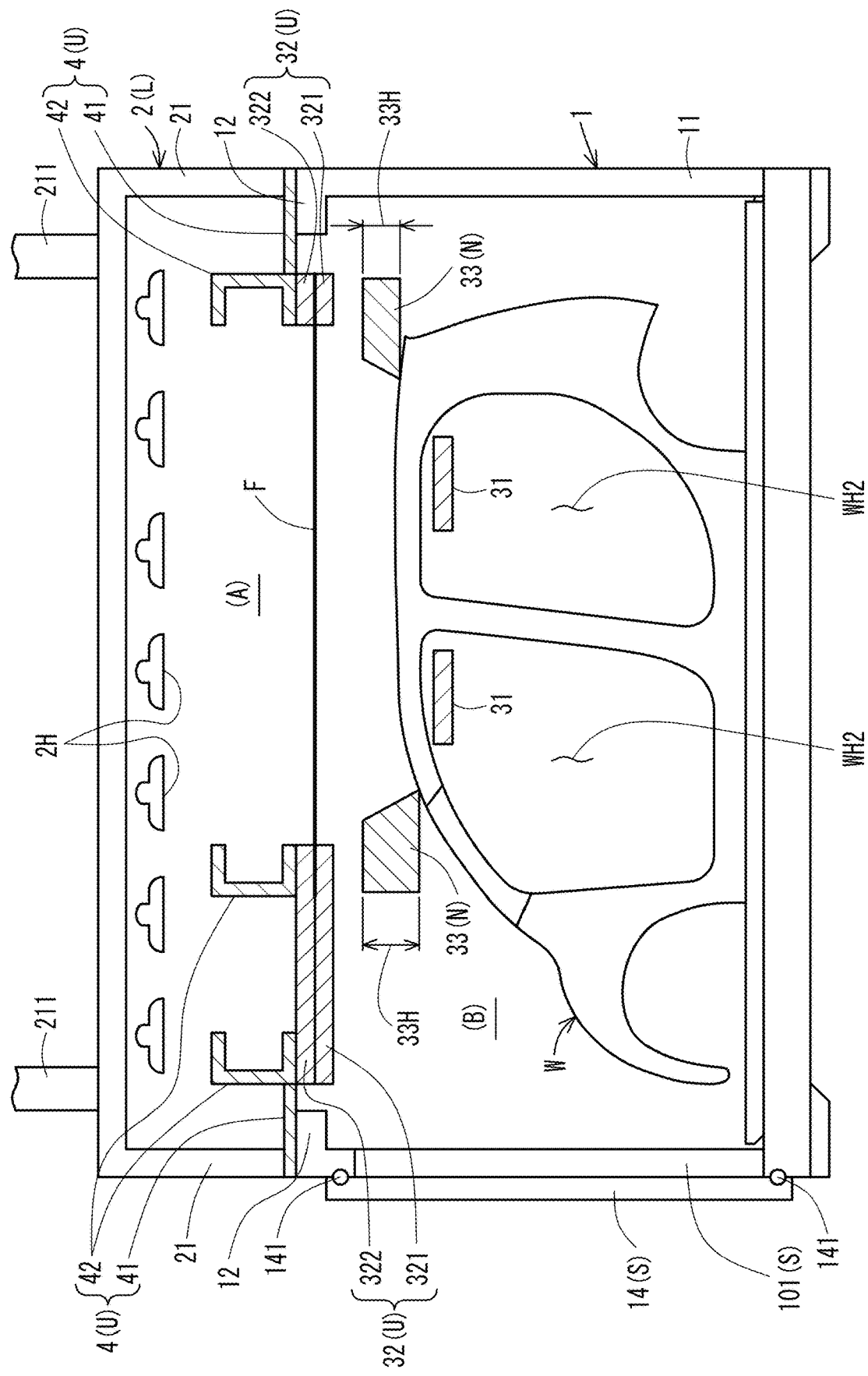
FIG. 8 is a longitudinal cross-sectional explanatory view illustrating a state immediately after a sealing step of the partial decoration forming apparatus in Example 1.
Figure 9:
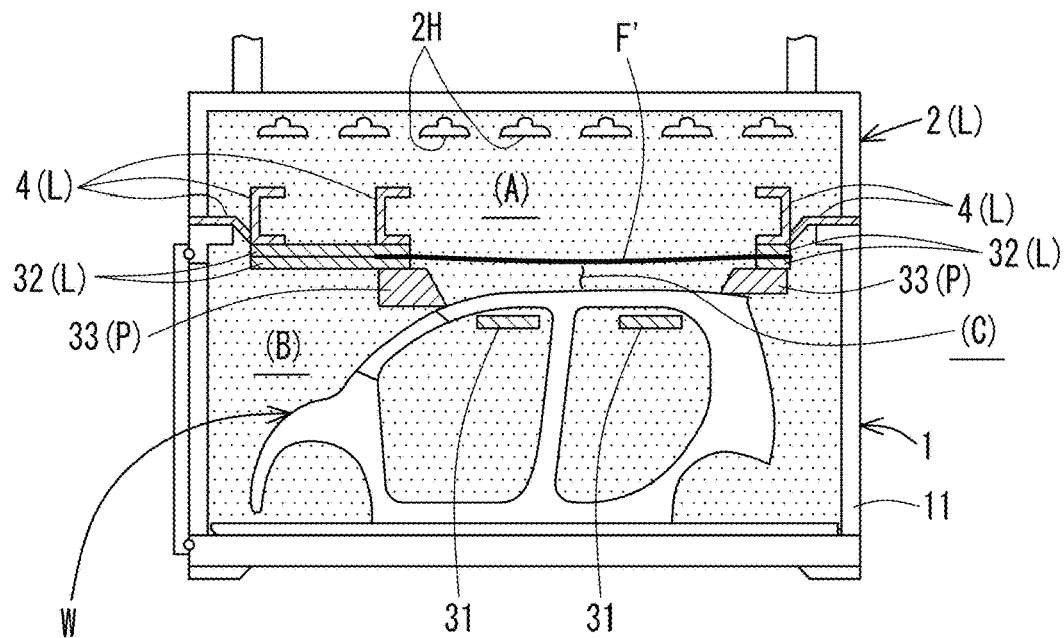
FIGS. 9(a) and 9(b) are longitudinal cross-sectional explanatory views illustrating a state after a first pressure adjusting step of the partial decoration forming apparatus in Example 1.
Figure 9:
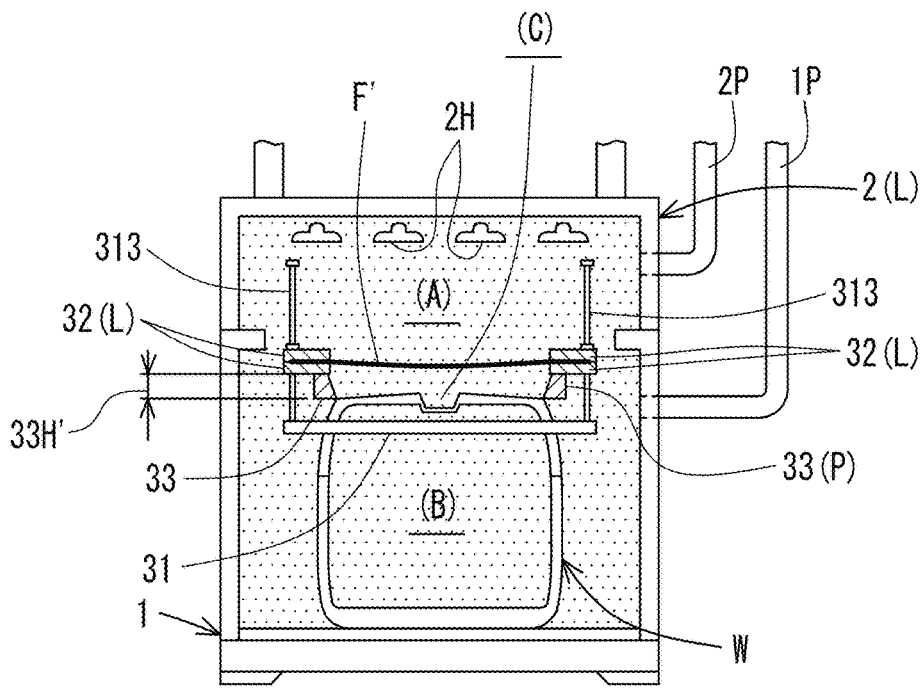
Figure 10:
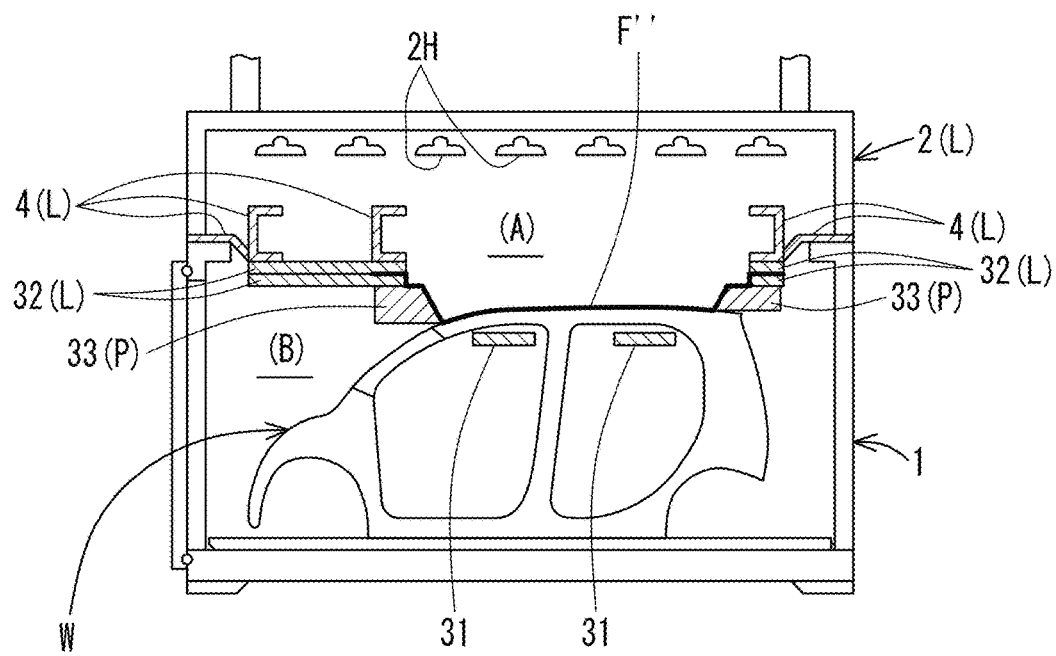
FIGS. 10(a) and 10(b) are longitudinal cross-sectional explanatory views illustrating a state after a second pressure adjusting step of the partial decoration forming apparatus in Example 1.
Figure 10:
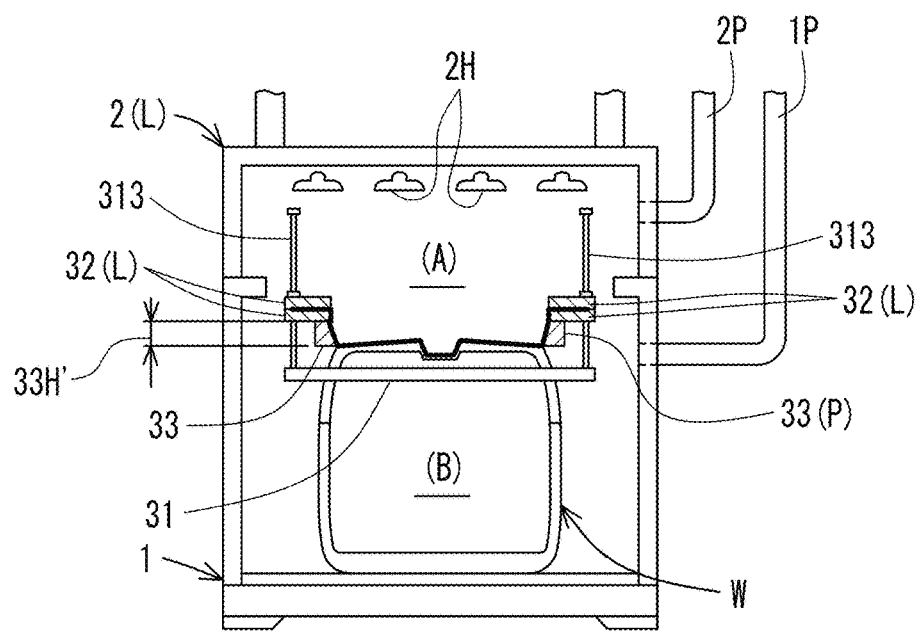
Figure 11:
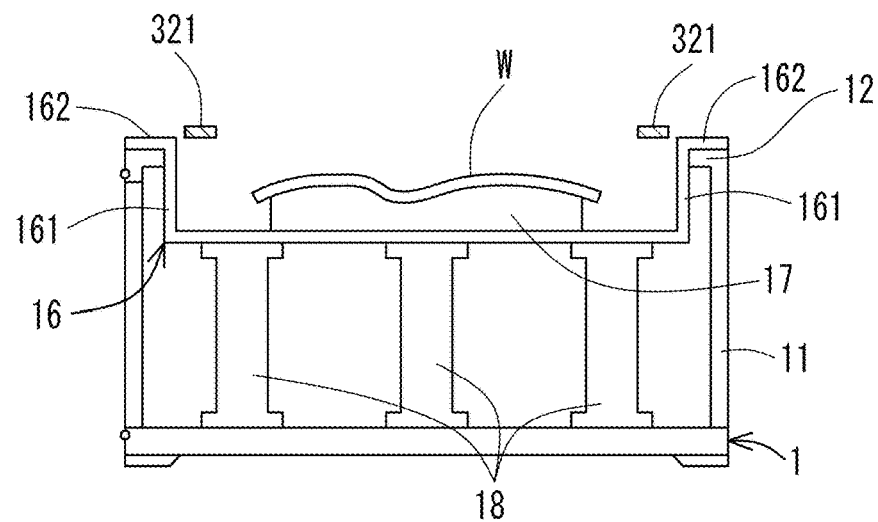
FIGS. 11(a) and 11(b) are partial explanatory perspective views illustrating an angular body in a pre-accommodating step and a film setting step of a partial decoration forming apparatus in Example 2.
Figure 11:
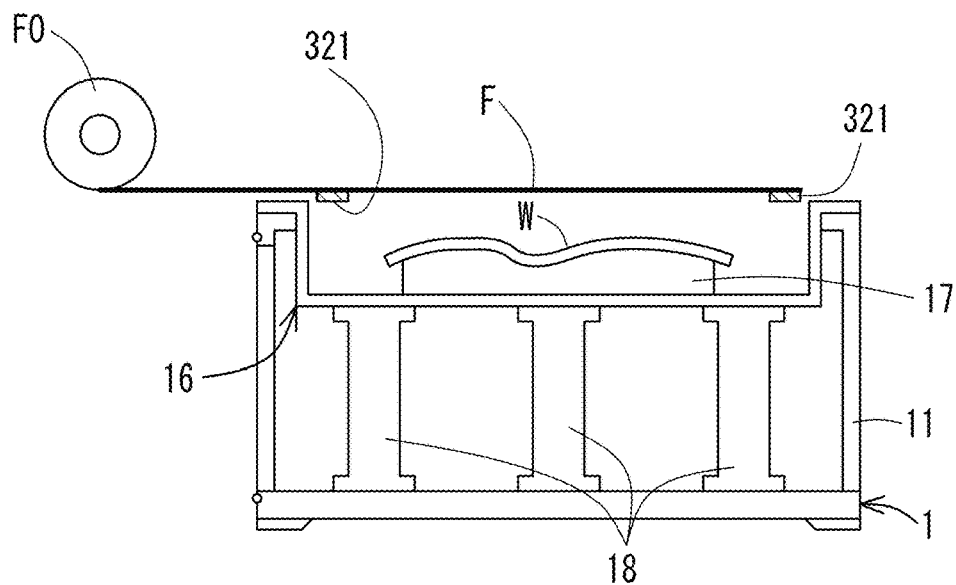
Figure 12:
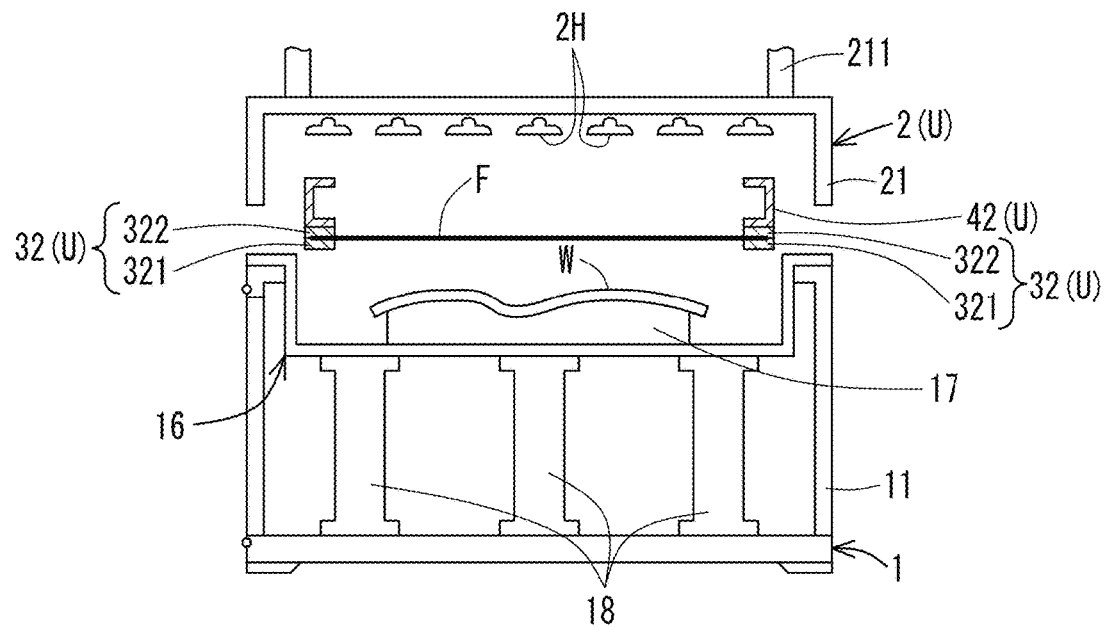
FIGS. 12(c) and 12(d) are partial explanatory perspective views illustrating states after the film setting step and a first sealing step of the partial decoration forming apparatus in Example 2.
Figure 12:
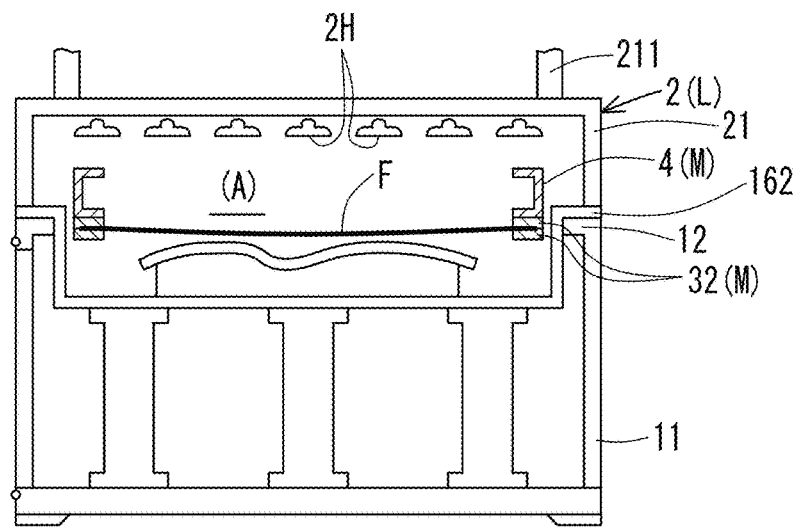
Figure 24:
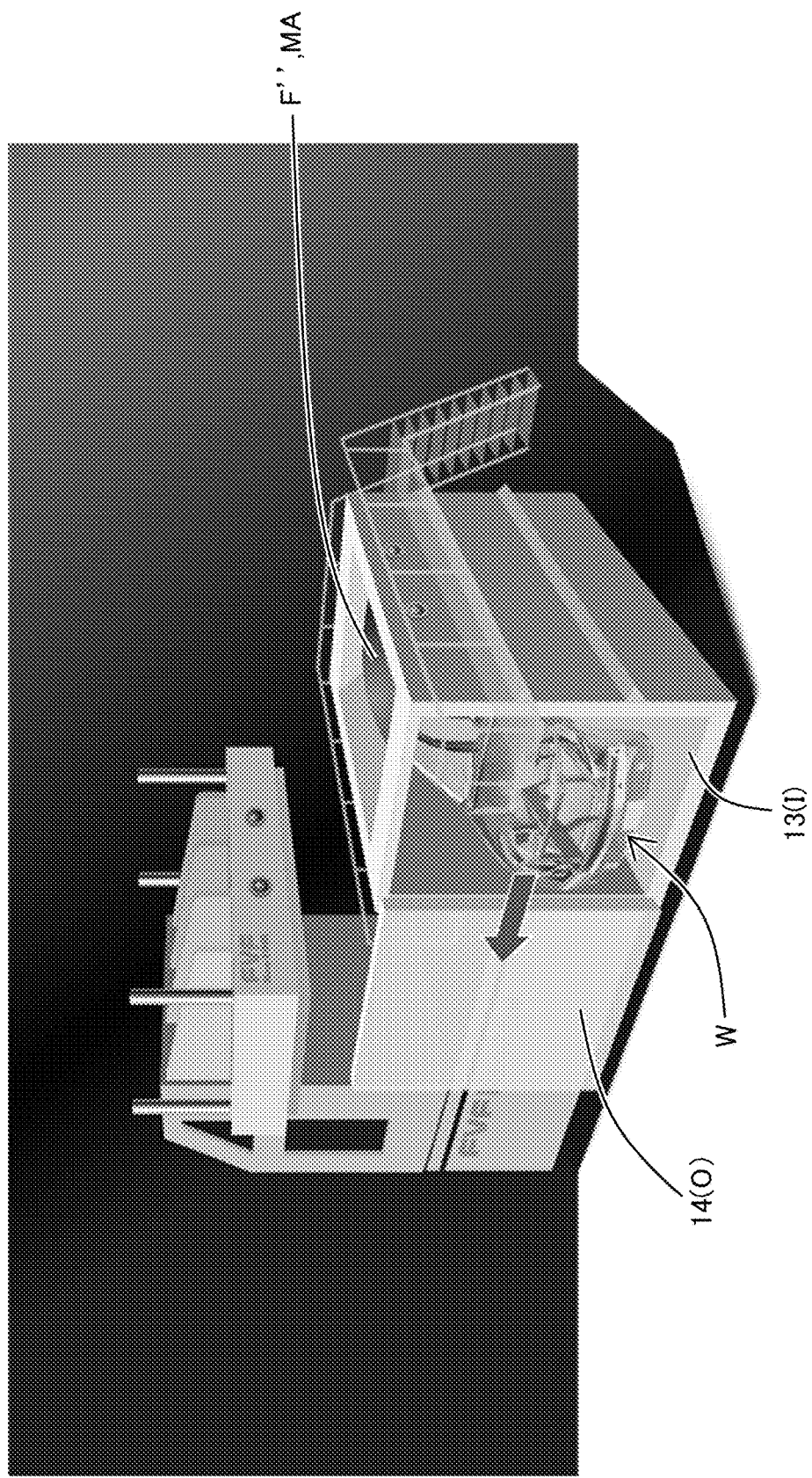
FIG. 24 is an explanatory perspective view illustrating the state after the second pressure adjusting step of the partial decoration forming apparatus in Example 3.

That is, the method includes:

a pre-setting step (FIGS. 2 and 4) of placing the body to be coated (W) on the bottom plate (13) in the drawn-out state drawn out from the lower box (1) to the outside, and attaching the fastening base body (31) to the body to be coated (W) to surround a lower peripheral portion of the decoration forming range (MA) of the body to be coated;

an accommodating step (FIGS. 3 and 5) of accommodating the bottom plate (13) in the lower box (1) to accommodate the body to be coated in the lower box (1), and in addition, bringing the surrounding frame body (33) having a frame hole shaped to surround the decoration forming range into contact with an upper portion of the body to be coated and vertically connecting the surrounding frame body (33) to the fastening base body (31);

a film setting step (FIGS. 6 to 7(b)) of expanding the decorative film larger than the planar projected area of the decoration forming range in the lateral direction above the upper opening of the lower box (1) so as to cover the upper opening, and sandwiching the peripheral portion of the decorative film with the holding frame (32) from above and below and holding the decorative film;

a first sealing step (FIG. 8) of arranging the upper box (2) at a lifted position (U) at which the lower opening of the upper box (2) is located above and opposed to the upper opening of the lower box (1), lowering the upper box (2) from the lifted position (U) to a lowered position (L) at which the upper space and the lower space are vertically contiguously formed with the decorative film interposed between the lower opening and the upper opening, and forming the upper space in the sealed state and the lower space in the sealed state;

a first pressure adjusting step of causing the pressure control device to bring the lower space in the sealed state and the upper space in the sealed state into a predetermined first pressure state where the pressure in the lower space and the pressure in the upper space are lowered to be equal to each other;

a second sealing step (FIGS. 9(a) and 9(b)) of bringing the decorative film or the holding frame on the periphery of the decorative film close to the body to be coated in the lower space in the sealed state to form a surrounded space in the sealed state whose top and bottom are surrounded by the decoration forming range on the body to be coated and the decorative film covering the decoration forming range from above;

a second pressure adjusting step (FIGS. 10(a) and 10(b)) of causing the pressure control device to release the lower space in the sealed state excluding the surrounded space in the sealed state and the upper space in the sealed state, to an atmospheric pressure from the pressure-reduced state so as to instantaneously increase the pressures in the lower space and in the upper space, and to bring the lower space and the upper space into a second pressure state where the pressures are equal to each other, while keeping inside of the surrounded space in the first pressure state;

a retracting step of retracting the upper box (2) upward to release the upper opening of the lower box (1) after the second pressure adjusting step; and a taking-out step (FIGS. 24 and 25) of changing the front door from the closed state (S) into the opened state (O), changing the bottom plate (13) from an accommodated state (I) of being accommodated in the lower box (1) into the drawn-out state (O) of being drawn out to the outside of the lower box (1), while keeping the body to be coated (W) placed on the bottom plate (13), and taking out the body to be coated subjected to partial decoration.

In particular, in the pre-setting step illustrated in FIG. 2, the bottom plate (13) of the lower box (1) is brought into the drawn-out state, the body to be coated (W) is placed on the bottom plate, two plate-shaped fastening base bodies (31) are inserted into openings (WH1, WH2, WH3) of the body to be coated (W), and connecting holes (31C) at both ends of the fastening base bodies (31) project to the right and left from the body to be coated (W). The connecting holes (31C) of the two fastening base bodies (31) projecting to the side of the body to be coated (W) are coupled to each other by a coupler (312).

Then, in the accommodating step illustrated in FIG. 3, the surrounding frame body (33) which is an airtight frame is brought into contact with the upper portion of the body to be coated (W) so as to surround the decoration forming range (MA), and the body to be coated (W) and the surrounding frame body (33) are accommodated in the lower space. At that time, the coupler (312) is removed and connecting rods (34) in the vertical direction for regulating the height of the fastening base body (31) are connected to the connecting holes (31C). In addition, for the subsequent holding step, a lower holding frame (321) is set in the vicinity of an upper portion of the upper opening (102).

(Upper Box)

The upper box (2) is supported on an upper side portion of a sliding holding frame capable of sliding on the slide base (24) to the right and left, and is supported by support arms (211) so as to be vertically movable. Communicating pipes (1P) communicating with the pressure control device, not illustrated, are connected to a side of the upper box (2). The upper box (2) has an upper space (A) inside formed by surrounding four sides of a rectangular top plate by a side frame (21) in the vertical direction. A frame lower surface (22) of the side frame (21) is opposed to a side upper surface (12) of the lower box. In the first sealing step illustrated in FIG. 8, the frame lower surface (22) of the upper box (2) and the side upper surface (12) of the lower box are in contact with each other with a holding band (41) of a holding and regulating body (4) therebetween, and thus the upper space and the lower space are brought into a sealed state.

A heater (2H) for heating the held decorative film (F) is arranged in the upper space. The heater (2H) heats the decorative film (F) after the first sealing step to obtain a decorative film (F') in a drawn down state. The decorative film (F') in the drawn down state, which is semi-molten, is in a curved sagged state due to its own weight, and is in a decoration-forming enabled state upon pressure fluctuation (FIGS. 9(a) and 9(b)).

(Holding Frame (32))

The holding frame (32) can hold the peripheral portion of the decorative film (F) larger than the planar projected area of the decoration forming range (MA) in the frame hole by expanding and stretching the decorative film (F) in the lateral direction above the upper opening or below the lower opening.

(Surrounding Frame Body (33))

The surrounding frame body (33) is a rectangular frame integrally formed in a four-sided frame shape in plan view having the frame hole (330) larger than the planar projected area of the decoration forming range (MA). The frame inner surface (331) is formed as an inclined surface whose normal line is in an oblique direction inclined toward the center of the frame hole and inclined upward, and has a predetermined frame height (33H) in a released state. The periphery of the surrounding frame body (33) is surrounded by an elastic material. When the surrounding frame body (33) is elastically deformed in the second sealing step illustrated in FIGS. 9 (a) and 9(b), the surrounding frame body (33) having the frame height (33H) is compressed to have a smaller compressed frame height (33H').

(Surrounded Space (C))

The holding frame (32) which holds and stretches the decorative film (F) and the surrounding frame body (33) are brought into contact with each other in the lower space in the sealed state so as to form the surrounded space (C) in the sealed state at the frame inside of the surrounding frame body (33) with the decorative film (F) held and stretched by the holding frame (32) as an upper edge of the surrounded space (C) and the body to be coated (W) in the decoration forming range (MA) as a lower edge of the surrounded space (C).

(Pressure Control Device)

The pressure control device can bring the lower space in the sealed state and the upper space (A) in the sealed state into the predetermined first pressure state where the pressure in the lower space and the pressure in the upper space are equal to each other, can instantaneously increase the pressure in the lower space in the sealed state excluding the surrounded space (C) in the sealed state and the pressure in the upper space (A) in the sealed state from the pressure-reduced state to the second pressure state where the pressures are equal to each other, while keeping inside of the surrounded space (C) in the sealed state at the first pressure state.

(Partial Decoration Forming Method)

The partial decoration forming method in Example 1 of the present invention is a method of using the predetermined partial decoration forming apparatus for performing partial decoration forming on the decoration forming range (MA) in the surrounded space (C) with the decorative film (F). The method includes:

an accommodating step of bringing the surrounding frame body (33) into contact with the upper portion of the body to be coated (W) to surround the decoration forming range (MA) and accommodating the body to be coated (W) and the surrounding frame body (33) in the lower box (1);

a film setting step of expanding the decorative film (F) larger than the planar projected area of the decoration forming range (MA) in the lateral direction above the upper opening or below the lower opening to hold the peripheral portion of the decorative film (F) with the holding frame (32);

a first sealing step of forming the upper space (A) in the sealed state and the lower space in the sealed state by vertically contiguously forming the upper space (A) and the lower space with the decorative film (F) interposed between the lower opening of the upper box (2) and the upper opening of the lower box (1) opposed to each other;

a first pressure adjusting step of causing the pressure control device to bring the lower space in the sealed state and the upper space (A) in the sealed state into the predetermined first pressure state where the pressure in the lower space and the pressure in the upper space (A) are equal to each other;

a second sealing step of bringing the decorative film (F) or the holding frame (32) on the periphery of the decorative film (F) and the surrounding frame body (33) into contact with each other in the lower space in the sealed state to form the surrounded space (C) in the sealed state at the frame inside of the surrounding frame body (33); and a second pressure adjusting step of causing the pressure control device to instantaneously increase the pressure in the lower space in the sealed state excluding the surrounded space (C) in the sealed state and the pressure in the upper space (A) in the sealed state from the pressure-reduced state to the second pressure state where the pressures are equal to each other, while keeping inside of the surrounded space (C) in the sealed state at the first pressure state.

According to the second sealing step, by surrounding only a surface to be decorated in the decoration forming range (MA) with the surrounding frame, the surrounded space (C) in the sealed state in which the decorative film (F) is stretched over the upper portion of the surrounded space (C) can be formed in the lower space in the sealed state controlled in the first pressure state. According to the second pressure adjusting step, by instantaneously increasing the pressure in the upper space (A) while keeping the surrounded space (C) in the sealed state at the first pressure state, decoration forming can be instantaneously performed on the decoration forming range (MA) by the pressure difference between the upper space (A) and the surrounded space (C). In addition, according to the second pressure adjusting step, by instantaneously increasing the pressures in the upper space (A) and in the lower space in a state where the pressures remain equal to each other, an influence due to pressure difference is not generated in the lower space (B) excluding the surrounded space (C).

As described, as a third sealed space between the upper space (A) and the lower space, the surrounded space (C) is formed in the lower space. Therefore, even in a case where an indentation, a hole, or a gap exists on the back side of the surface to be decorated of the body to be coated (W), an influence caused by the sudden pressure difference in the second pressure step is avoided.

In addition, even in a case where the body to be coated (W) is supported by a receiving jig or the like, there is no need to provide a pressure guiding circuit for making the pressure on a lower-surface side of the body to be coated (W) uniform. Therefore, regardless of the performance of the body to be coated (W) of retaining the form upon pressure reduction, even if the body to be coated (W) has a complicated shape, it is possible to reliably perform partial decoration forming on the body to be coated (W) with a relatively simple structure. For example, even in a case where there is a fine pit or hole, a welded portion, a bonded portion, or an internal space on the back side of the range, formation of the surrounded space (C) in the sealed state in the partial decoration forming range (MA) of a surface to be coated prevents the formed portion of the body to be coated (W) from being deformed or broken, and prevents pressure leakage.

(First Pressure Step and Second Pressure Adjusting Step)

The first pressure step is a step of simultaneously sucking the lower space in the sealed state excluding the surrounded space (C) and the upper space (A) in the sealed state to bring the spaces into the first pressure state where the pressure is lower than an atmospheric pressure.

The second pressure adjusting step is a step of simultaneously releasing the lower space in the sealed state excluding the surrounded space (C) and the upper space (A) in the sealed state, brought into the first pressure state in the first pressure adjusting step, to an atmospheric pressure, and bringing the spaces into the second pressure state where the pressure is equal to the atmospheric pressure. In the above steps, it is enough to include as the pressure control device at least a communicating pipe communicating with the upper box (2) and the lower box (1), and a pressure reducing pump connected to the communicating pipe. Reliable pressure control can be performed with a simple mechanism.

(Formation of Surrounded Space (C))

The first sealing step is a step of holding and fixing the edge portion of the decorative film (F) expanded in the lateral direction by the holding frame (32) which is vertically movable, and accommodating the holding frame (32) holding the decorative film (F) in the lower space or the upper space (A) by contiguously forming the upper space (A) and the lower space.

The second sealing step is a step of lowering the holding frame (32) to bring a contact upper surface of the body to be coated (W) including the decoration forming range (MA) or a contact surface of the surrounding frame body (33) arranged on the body to be coated (W) into contact with an opposed contact surface of the holding frame (32), and forming the surrounded space (C) surrounded by the contact upper surface of the body to be coated (W) in the decoration forming range (MA), the frame inner surface of the surrounding frame body (33), and the lower surface of the decorative film (F).

According to the first sealing step, the holding frame (32) which is vertically movable is arranged in advance in the vicinity of the upper portion of the upper opening or in the vicinity of a lower portion of the lower opening, and the decorative film (F) held by the holding frame (32) is accommodated in the upper space (A) or the lower space vertically contiguously formed. In this state, no surrounded space (C) is formed in the lower space, and the entire lower space is adjusted to the first pressure state in the subsequent first pressure adjusting step. Then, in the subsequent second sealing step, the surrounded space (C) which is also sealed in the first pressure state is formed in the lower space sealed in the first pressure state. The surrounded space (C) in the first pressure state is easily formed by vertically moving the holding frame (32) in the lower space in the sealed state and bringing the holding frame (32) into contact until airtightness is maintained. In addition, by using the holding frame (32) which is vertically movable, it is possible to easily and reliably form the surrounded space (C) in the sealed state without greatly moving the body to be coated (W) upward.

Particularly in Example 1, by rotating the connecting rod and lowering the holding frame (32) until the holding frame (32) comes into contact with the surrounding frame body (33), an upper contact surface of the surrounding frame body (33) arranged on the body to be coated (W) and the opposed contact surface of the lower portion of the holding frame (32) are brought into contact with each other. The surrounding frame body (33) is in contact with and arranged on the body to be coated (W) in advance outside the decoration forming range (MA) in plan view in advance, and the decorative film (F) is stretched and set in advance at the frame inside of the holding frame (32). Therefore, the surrounded space (C) surrounded by the decoration forming range (MA) of the body to be coated (W), the frame inner surface of the surrounding frame body (33), and the decorative film (F) is formed in the sealed manner when the surrounding frame body (33) and the holding frame (32) are opposed to and are brought into contact with each other (FIGS. 9(a) and 9(b)).

(Surrounding Frame Body (33))

The surrounding frame body (33) includes an elastic material which can be elastically deformed by pressure contact in at least one of an arrangement contact portion on the body to be coated (W) and a contact portion which is to be brought into contact with the opposed contact surface of the holding frame (32).

The second sealing step is a step of bringing the contact surface of the body to be coated (W) including the decoration forming range (MA) or the contact surface of the surrounding frame body (33) arranged on the body to be coated (W) close to and into pressure contact with the opposed contact surface of the holding frame (32), and forming the surrounded space (C) in an airtight manner surrounded by the upper surface of the body to be coated (W) in the decoration forming range (MA), the frame inner surface of the surrounding frame body (33) and the lower surface of the decorative film (F).

According to the second sealing step using the surrounding frame body (33), it is possible to more reliably form the surrounded space (C) in an airtight manner regardless of the contact state on the holding frame (32) which is lowered or an arrangement and contact state on the body to be coated (W). In the examples to be described later, an entire surrounding frame body (33) is made of an elastic material that maintains airtightness from a portion in contact with the outside. As another mode, an entire outer peripheral portion of a surrounding frame body (33) may be covered with an elastic material that maintains airtightness from a portion in contact with the outside.

Specifically, in Example 1, the entire surface portion of the surrounding frame body (33) is covered with an elastic material, and pressure contact with the holding frame (32) and pressure contact with the body to be coated (W) make the surrounding frame body (33) be elastically compressed to maintain the surrounding frame body (33) at a compressed state (P) where the frame height (33H) is changed into the compressed frame height (33H') and to maintain airtightness of the side portion of the surrounded space (C). In addition, in Example 1, by rotating the connecting rod so as to lower the holding frame (32) close to the fastening base body (3), the contact surface of the surrounding frame body (33) arranged on the body to be coated (W) is brought close to and into pressure-contact with the opposed contact surface of the holding frame (32), and the contact surface of the surrounding frame body (33) arranged on the body to be coated (W) is brought close to and into pressure-contact with the opposed contact surface of the body to be coated (W).

(Fastening base body (3) and Connecting Rod)

The predetermined partial decoration forming apparatus further includes:

the fastening base body (3) which is disposed to be locked to the opening (WH1) of the body to be coated (W) and partially projects from the outer edge of the decoration forming range (MA) to the outside of the body to be coated (W) in plan view; and the connecting rod vertically connecting the fastening base body (3) and the holding frame (32) and capable of shortening the vertical connection distance between the fastening base body (3) and the holding frame (32).

The accommodating step is a step of accommodating the body to be coated (W) in the lower box (1) in a state where the fastening base body (3) is locked to and arranged at the opening (WH1) of the body to be coated (W).

The film setting step is a step of arranging the holding frame (32) above the fastening base body (3) and above the surrounding frame body (33), and vertically connecting the holding frame (32) and the fastening base body (3) by the connecting rod.

In the second sealing step, the vertical connection distance between the holding frame (32) and the fastening base body (3) vertically connected is shortened, the distance between the fastening base body (3) and the holding frame (32) is shortened, the surrounding frame body (33) is vertically compressed by the fastening base body (3) and the holding frame (32), and the surrounded space (C) surrounded by the upper surface of the body to be coated (W) in the decoration forming range (MA), the frame inner surface of the surrounding frame body (33), and the decorative film (F) is formed in the sealed manner.

With the above configuration, the surrounding frame body (33) and the part of the body to be coated (W) in the decoration forming range (MA), surrounded by the surrounding frame body (33), are sandwiched between the fastening base body (3) and the holding frame (32). Therefore, the surrounded space (C) can be easily and reliably formed in a sealed manner.

For example, in Example 1 to be described later, by rotating the connecting rod so as to lower the holding frame (32) close to the fastening base body (3) and bring the holding frame (32) into pressure-contact with the fastening base body (3), the surrounding frame body (33) is brought into the compressed state (P) where the surrounding frame body (33) is elastically compressed, the distance between the fastening base body (3) under the decoration forming range (MA) and the holding frame (32) above the decoration forming range (MA) is shortened, the surrounding frame body (33) is vertically compressed by the fastening base body (3) and the holding frame (32), and the surrounded space (C) surrounded by the decoration forming range (MA), the frame inner surface of the surrounding frame body (33), and the decorative film (F) is formed in the sealed manner.

EXAMPLE 2

A partial decoration forming method using a decorative film (F) is for performing partial decoration forming on a body to be coated (W) by setting a surface in a predetermined range close to one end portion of the body to be coated (W) as a decoration forming range (MA), and sticking the decorative film (F) to the partial decoration forming range (MA) using a predetermined partial decoration forming apparatus, the predetermined partial decoration forming apparatus including:

a lower box (1) which has a lower partitioned space opened at an upper end, and accommodates in the lower partitioned space the body to be coated (W) with the decoration forming range (MA) directed upward;

an upper box (2) which has an upper space (A) opened at a lower end, and can contiguously form the upper space (A) above the lower partitioned space in a sealed manner with the decorative film (F) interposed between the lower opening of the upper box (2) and the upper opening of the lower box (1) opposed to each other;

a base frame body (16) which has a lower partitioned space opened at an upper end and is disposed in the lower box (1), and can partition an upper portion of the lower partitioned space of the lower box;

a holding frame (32) which has a frame hole larger than the planar projected area of the decoration forming range (MA) and which can hold a peripheral portion of the decorative film (F) expanded in a lateral direction and can stretch the decorative film (F) in the frame hole; and a pressure control device which controls the pressures in the upper space (A) and the lower partitioned space in a state where the upper box (2) is arranged on the lower box (1) in a sealed manner, the method using the predetermined partial decoration forming apparatus, and including:

a partitioning and accommodating step of accommodating the body to be coated (W) and disposing the base frame body (16) in the lower box (1) to partition the upper portion of the lower partitioned space of the lower box, and accommodating and supporting at least part of the body to be coated (W) including the decoration forming range (MA) in the lower partitioned space which is partitioned;

a film setting step of expanding the decorative film (F) larger than the planar projected area of the decoration forming range (MA) in the lateral direction above the upper opening or below the lower opening to hold the peripheral portion of the decorative film (F) with the holding frame (32);

a first sealing step of forming the upper space (A) in the sealed state and the lower partitioned space in the sealed state by vertically contiguously forming the upper space (A) and the lower partitioned space with the decorative film (F) interposed between the lower opening of the upper box (2) and the upper opening of the lower box (1) opposed to each other;

a first pressure adjusting step of causing the pressure control device to bring the lower partitioned space in the sealed state and the upper space (A) in the sealed state into a predetermined first pressure state where the pressure in the lower partitioned space and the pressure in the upper space (A) are equal to each other;

a second sealing step of bringing the decorative film (F) or the holding frame (32) on the periphery of the decorative film (F) and the base frame body (16) into contact with each other in the lower partitioned space of the lower box (1) in the sealed state to form a surrounded space (C) in a sealed state at frame inside of the base frame body (16); and a second pressure adjusting step of causing the pressure control device to instantaneously increase the pressure in the lower partitioned space in the sealed state excluding the surrounded space (C) in the sealed state and the pressure in the upper space (A) in the sealed state from the pressure-reduced state to a second pressure state where the pressures are equal to each other, while keeping inside of the surrounded space (C) in the sealed state at the first pressure state, and partial decoration forming is performed on the decoration forming range (MA) of the surrounded space (C) with the decorative film (F) in the second pressure adjusting step.

According to the second sealing step, by surrounding only a surface to be decorated in the decoration forming range (MA) with the surrounding frame, the surrounded space (C) in the sealed state in which the decorative film (F) is stretched over the upper portion of the surrounded space (C) can be formed in the lower partitioned space in the sealed state controlled in the first pressure state. According to the second pressure adjusting step, by instantaneously increasing the pressure in the upper space (A) while keeping the surrounded space (C) in the sealed state at the first pressure state, decoration forming can be instantaneously performed on the decoration forming range (MA) by the pressure difference between the upper space (A) and the surrounded space (C). In addition, according to the second pressure adjusting step, by instantaneously increasing the pressures in the upper space (A) and in the lower partitioned space of the lower box (1) in a state where the pressures remain equal to each other, an influence due to pressure difference is not generated in the lower partitioned space excluding the surrounded space (C).

As described, as a third sealed space between the upper space (A) and the lower partitioned space, the surrounded space (C) is formed in the lower partitioned space. Therefore, even in a case where an indentation, a hole, or a gap exists on the back side of the surface to be decorated of the body to be coated (W), an influence caused by the sudden pressure difference in the second pressure step is avoided.

In addition, even in a case where the body to be coated (W) is supported by a receiving jig or the like, there is no need to provide a pressure guiding circuit for making the pressure on a lower-surface side of the body to be coated (W) uniform. Therefore, regardless of the performance of the body to be coated (W) of retaining the form upon pressure reduction, even if the body to be coated (W) has a complicated shape, it is possible to reliably perform partial decoration forming on the body to be coated (W) with a relatively simple structure. For example, even in a case where there is a fine pit or hole, a welded portion, a bonded portion, or an internal space on the back side of the range, formation of the surrounded space (C) in the sealed state in the partial decoration forming range (MA) of a surface to be coated prevents a formed portion of the body to be coated (W) from being deformed or broken, and prevents pressure leakage.

(Formation of Surrounding Angle in a Sealed Manner)

Figure 13:
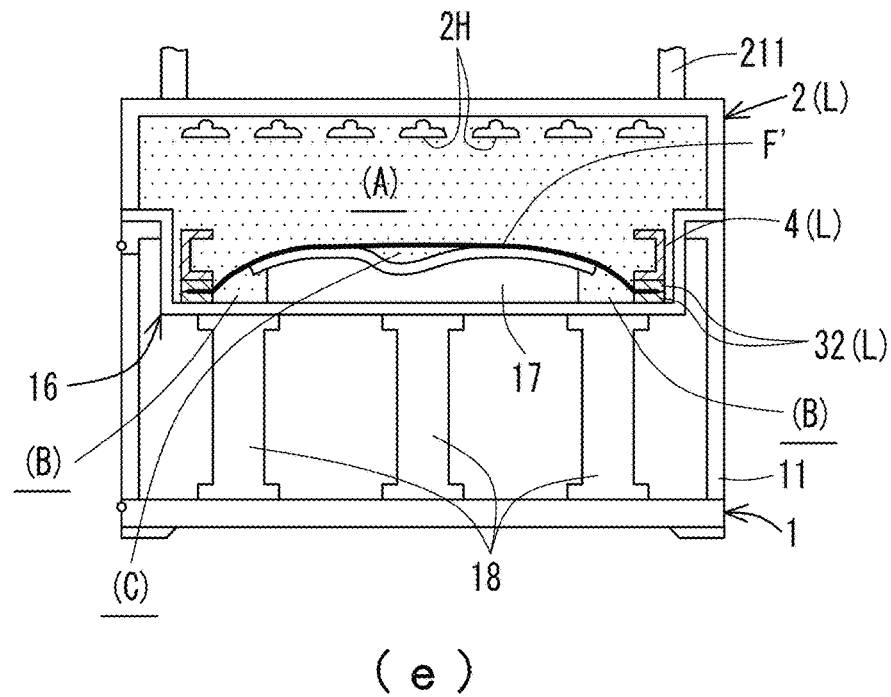
FIGS. 13(e) and 13(f) are partial explanatory perspective views illustrating states after a second sealing step and a second pressure adjusting step of the partial decoration forming apparatus in Example 2, respectively.
Figure 13:
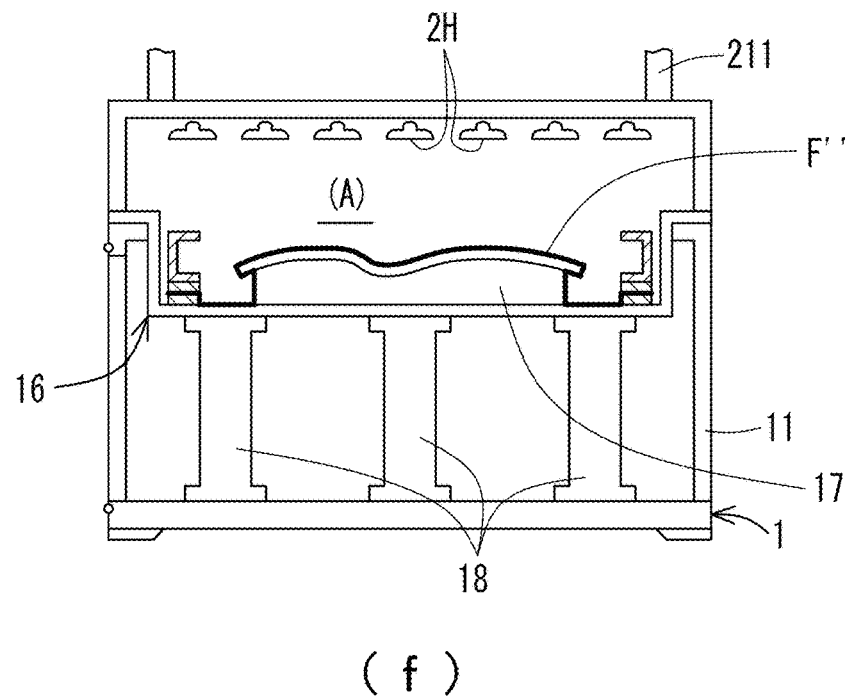
Figure 14:
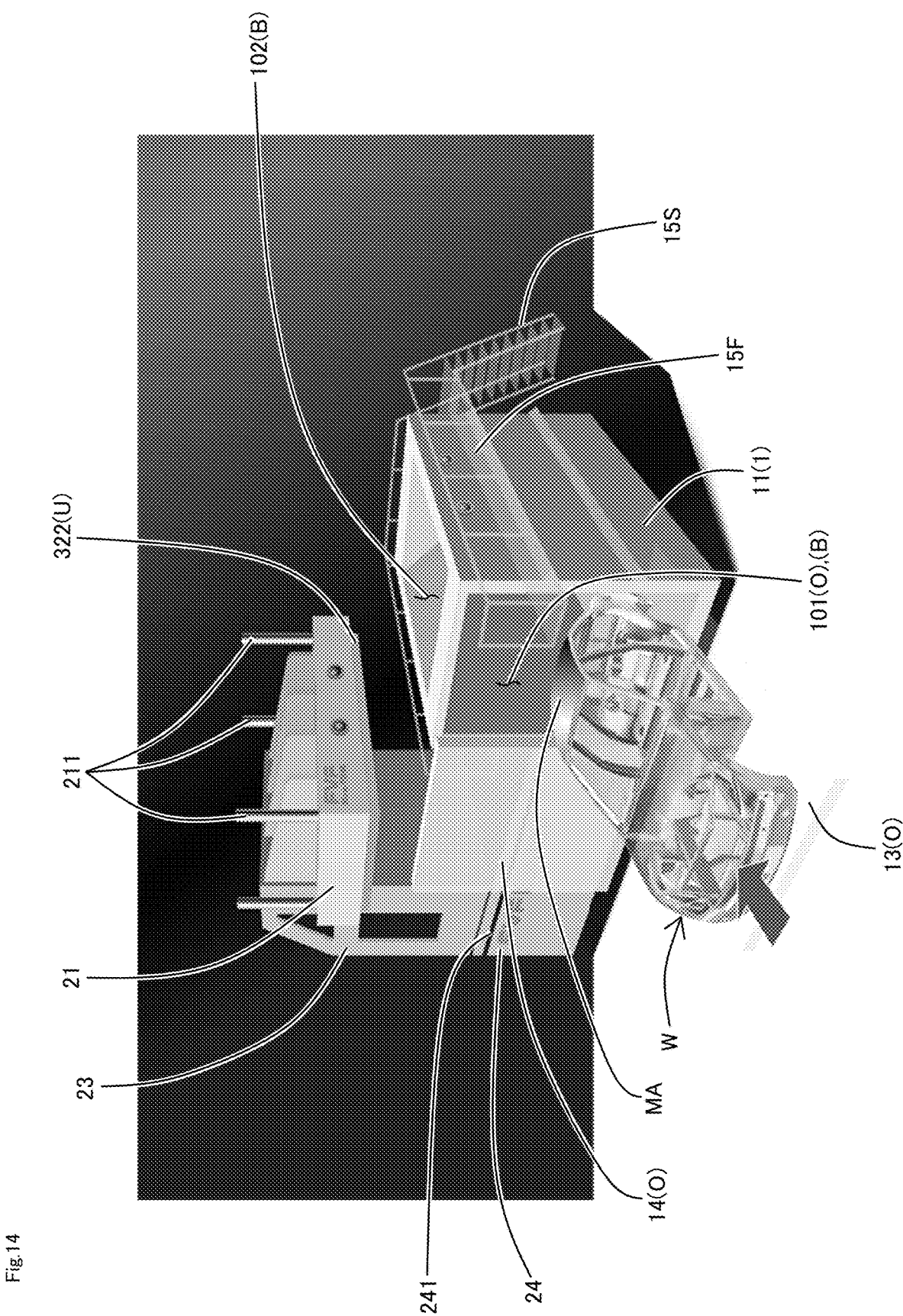
FIG. 14 is an explanatory perspective view illustrating a pre-accommodating step of a partial decoration forming apparatus in Example 3.
Figure 15:
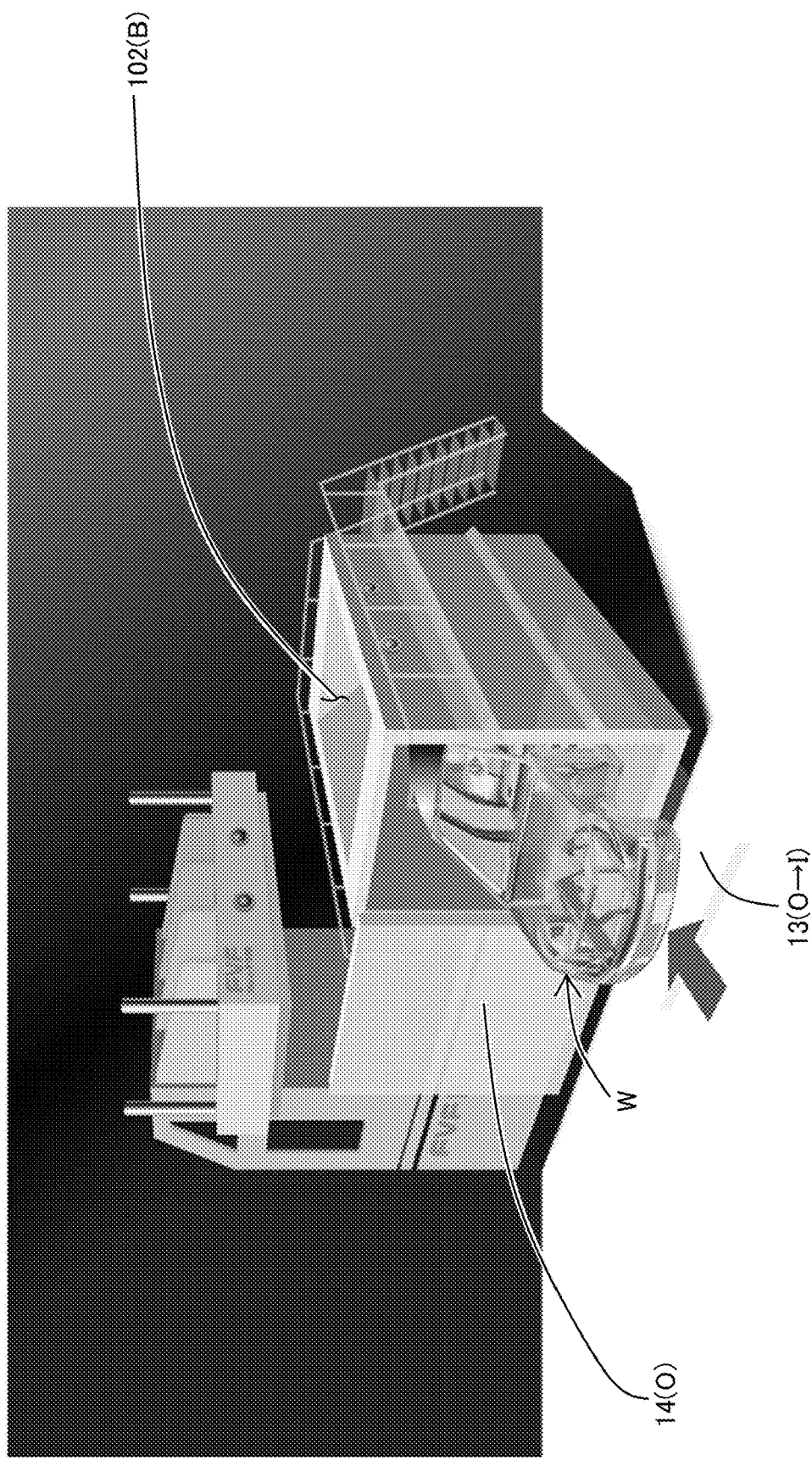
FIG. 15 is an explanatory perspective view illustrating the pre-accommodating step of the partial decoration forming apparatus in Example 3.
Figure 16:
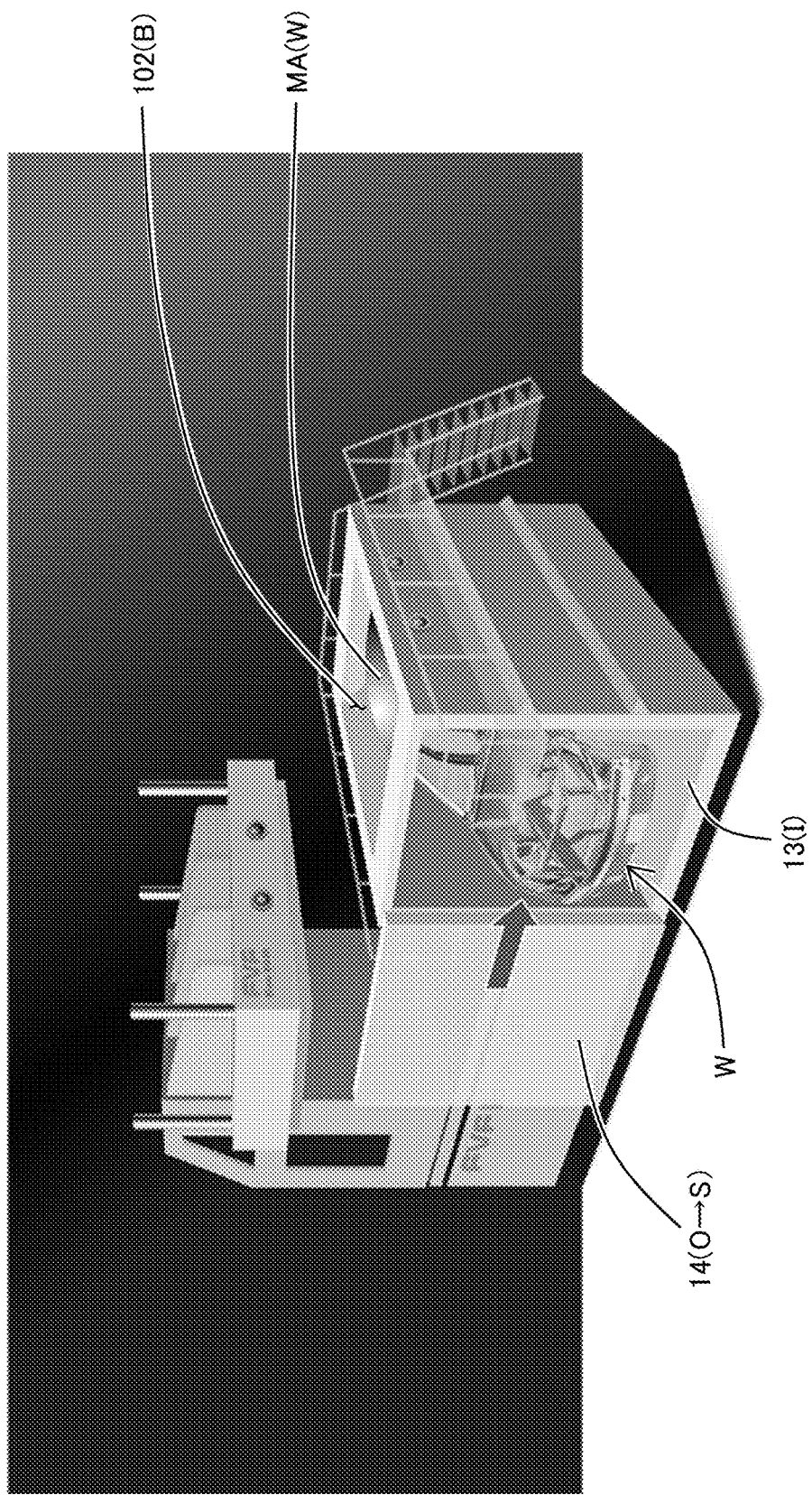
FIG. 16 is an explanatory perspective view illustrating the pre-accommodating step of the partial decoration forming apparatus in Example 3.
Figure 17:
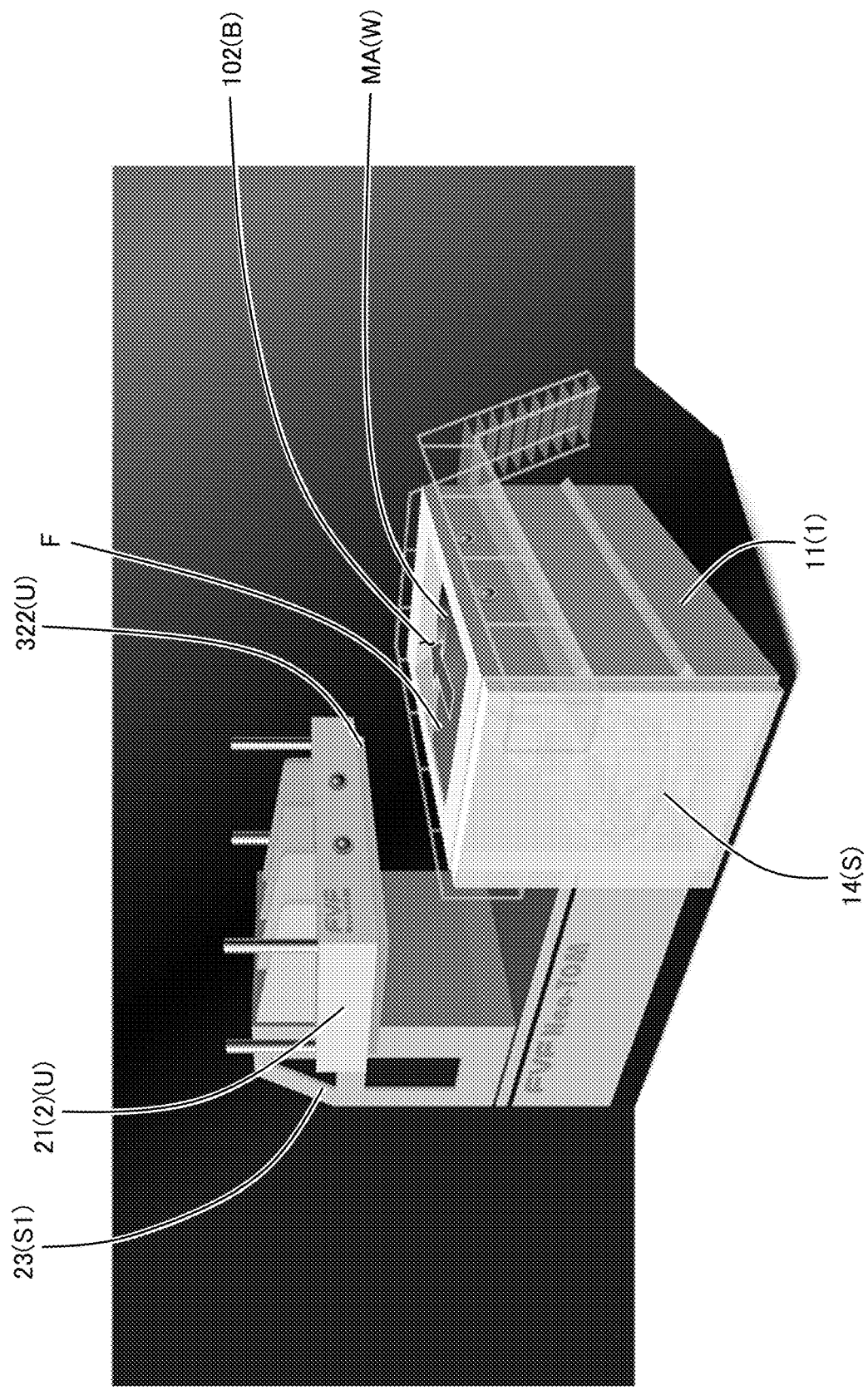
FIG. 17 is an explanatory perspective view illustrating the pre-accommodating step of the partial decoration forming apparatus in Example 3.
Figure 18:
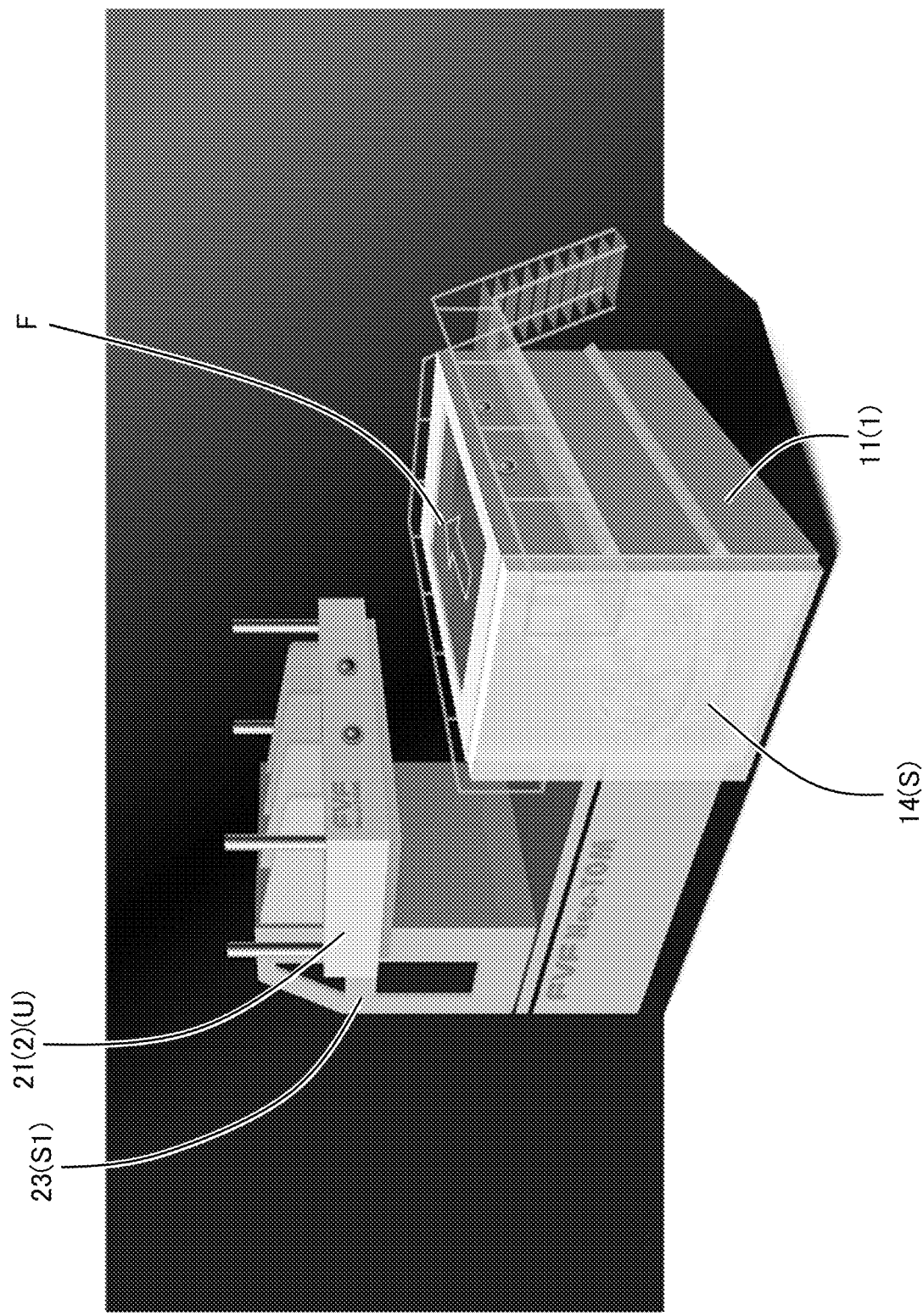
FIG. 18 is an explanatory perspective view illustrating the pre-accommodating step of the partial decoration forming apparatus in Example 3.
Figure 19:
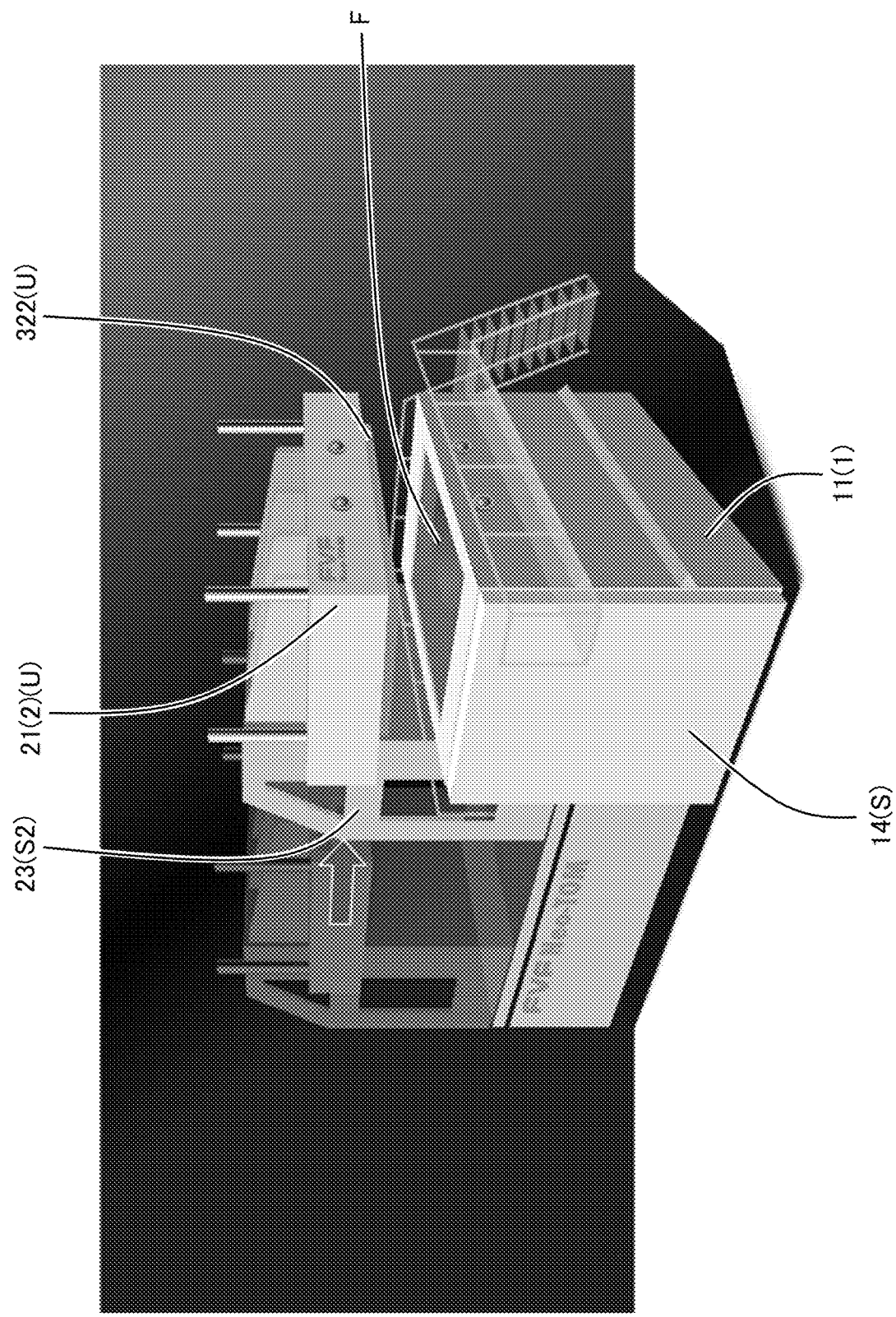
FIG. 19 is an explanatory perspective view illustrating the pre-accommodating step of the partial decoration forming apparatus in Example 3.

In addition, in Example 2, by lowering a regulating angle (42) so as to lower the holding frame (32) brought into contact with a lower portion of the regulating angle (42) close to a frame bottom surface of the base frame body (16), the contact surface of the body to be coated (W) including the decoration forming range (MA) and the decorative film (F) are brought into contact with each other. By lowering the holding frame (32), the surrounded space (C) surrounded by the decoration forming range (MA) of the body to be coated (W) and the decorative film (F) is formed in the sealed manner (FIG. 13(e)).

With the above configuration, the surrounding frame body (33) and the part of the body to be coated (W) in the decoration forming range (MA), surrounded by the surrounding frame body (33), are sandwiched between the fastening base body (3) and the holding frame (32). Therefore, the surrounded space (C) can be easily and reliably formed in a sealed manner.

For example, in Example 1 to be described later, by rotating the connecting rod so as to lower the holding frame (32) close to the fastening base body (3), the distance between the fastening base body (3) under the decoration forming range (MA) and the holding frame (32) above the decoration forming range (MA) is shortened, the surrounding frame body (33) is vertically compressed by the fastening base body (3) and the holding frame (32), and the surrounded space (C) surrounded by the decoration forming range (MA), the frame inner surface of the surrounding frame body (33), and the decorative film (F) is formed in the sealed manner.

According to the second sealing step, by surrounding only the surface to be decorated in the decoration forming range (MA) with the surrounding frame, the surrounded space (C) in the sealed state in which the decorative film (F) is stretched over the upper portion of the surrounded space (C) can be formed in the lower space in the sealed state controlled in the first pressure state. According to the second pressure adjusting step, by instantaneously increasing the pressure in the upper space (A) while keeping the surrounded space (C) in the sealed state at the first pressure state, decoration forming can be instantaneously performed on the decoration forming range (MA) by the pressure difference between the upper space (A) and the surrounded space (C). In addition, according to the second pressure adjusting step, by instantaneously increasing the pressures in the upper space (A) and in the lower space in a state where the pressures remain equal to each other, an influence due to pressure difference is not generated in the lower space (B) excluding the surrounded space (C).

As described, as the third sealed space between the upper space (A) and the lower space, the surrounded space (C) is formed in the lower space. Therefore, even in a case where an indentation, a hole, or a gap exists on the back side of the surface to be decorated of the body to be coated (W), an influence caused by the sudden pressure difference in the second pressure step is avoided.

In addition, even in a case where the body to be coated (W) is supported by a receiving jig or the like, there is no need to provide a pressure guiding circuit for making the pressure on a lower-surface side of the body to be coated (W) uniform. Therefore, regardless of the performance of the body to be coated (W) of retaining the form upon pressure reduction, even if the body to be coated (W) has a complicated shape, it is possible to reliably perform partial decoration forming on the body to be coated (W) with a relatively simple structure. For example, even in a case where there is a fine pit or hole, a welded portion, a bonded portion, or an internal space on the back side of the range, formation of the surrounded space (C) in the sealed state in the partial decoration forming range (MA) of the surface to be coated prevents a formed portion of the body to be coated (W) from being deformed or broken, and prevents pressure leakage.

In the above steps, it is enough to include as the pressure control device at least a communicating pipe communicating with the upper box (2) and the lower box (1), and a pressure reducing pump connected to the communicating pipe. Reliable pressure control can be performed with a simple mechanism by bypassing the communicating pipe and making the communicating pipe communicate with the pressure reducing pump.

According to the first sealing step, the holding frame (32) which is vertically movable is arranged in advance in the vicinity of the upper portion of the upper opening or in the vicinity of a lower portion of the lower opening, and the decorative film (F) held by the holding frame (32) is accommodated in the upper space (A) or the lower space vertically contiguously formed. In this state, no surrounded space (C) is formed in the lower space, and the entire lower space is adjusted to the first pressure state in the subsequent first pressure adjusting step. Then, in the subsequent second sealing step, the surrounded space (C) which is also sealed in the first pressure state is formed in the lower space sealed in the first pressure state. The surrounded space (C) in the first pressure state is easily formed by vertically moving the holding frame (32) in the lower space in the sealed state and bringing the holding frame (32) into contact until airtightness is maintained. In addition, by using the holding frame (32) which is vertically movable, it is possible to easily and reliably form the surrounded space (C) in the sealed state without greatly moving the body to be coated (W) upward.

Particularly in Example 1 to be described later, by rotating the connecting rod and lowering the holding frame (32) until the holding frame (32) comes into contact with the surrounding frame body (33), the upper contact surface of the surrounding frame body (33) arranged on the body to be coated (W) and the opposed contact surface of the lower portion of the holding frame (32) are brought into contact with each other. The surrounding frame body (33) is in contact with and arranged on the body to be coated (W) in advance outside the decoration forming range (MA) in plan view in advance, and the decorative film (F) is stretched and set in advance at the frame inside of the holding frame (32). Therefore, the surrounded space (C) surrounded by the decoration forming range (MA) of the body to be coated (W), the frame inner surface of the surrounding frame body (33), and the decorative film (F) is formed in the sealed manner when the surrounding frame body (33) and the holding frame (32) are opposed to and are brought into contact with each other (FIGS. 9(a) and 9(b)).

According to the second sealing step using the surrounding frame body (33) as in Example 1, it is possible to more reliably form the surrounded space (C) in an airtight manner regardless of the contact state on the holding frame (32) which is lowered or an arrangement and contact state on the body to be coated (W). In Example 1, the entire surrounding frame body (33) is made of an elastic material that maintains airtightness from the portion in contact with the outside. As another mode, an entire outer peripheral portion of a surrounding frame body (33) may be covered with an elastic material that maintains airtightness from a portion in contact with the outside.

In Example 1, by rotating the connecting rod so as to lower the holding frame (32) close to the fastening base body (3), the contact surface of the surrounding frame body (33) arranged on the body to be coated (W) is brought close to and into pressure-contact with the opposed contact surface of the holding frame (32), and the contact surface of the surrounding frame body (33) arranged on the body to be coated (W) is brought close to and into pressure-contact with the opposed contact surface of the body to be coated (W).

In addition, in Example 2, by lowering the regulating angle (42) so as to lower the holding frame (32) brought into contact with the lower portion of the regulating angle (42) close to the frame bottom surface of the base frame body (16), the contact surface of the body to be coated (W) including the decoration forming range (MA) and the decorative film (F) are brought into contact with each other. By lowering the holding frame (32), the surrounded space (C) surrounded by the decoration forming range (MA) of the body to be coated (W) and the decorative film (F) is formed in the sealed manner (FIG. 13(e)).

Even in a case where the body to be coated is supported by a receiving jig or the like as in Example 2, there is no need to provide a pressure guiding circuit for making the pressure on a lower-surface side of the body to be coated uniform. Therefore, regardless of the performance of the body to be coated of retaining the form upon pressure reduction, even if a body to be coated has a complicated shape, it is possible to reliably perform partial decoration forming on the body to be coated with a relatively simple structure. For example, even in a case where there is a fine pit or hole, a welded portion, a bonded portion, or an internal space on the back side of the range, formation of the surrounded space in the sealed state in the partial decoration forming range of the surface to be coated prevents the formed portion of the body to be coated from being deformed or broken, and prevents pressure leakage.

In the present invention, the surrounding frame body is brought into contact with the upper portion of the body to be coated to surround the decoration forming range, the body to be coated is accommodated, the upper space in a sealed state and the lower space in a sealed state are formed, and a surrounded space in a sealed state whose top and bottom are surrounded by the decorative film and the body to be coated in the decoration forming range is formed after the lower space and the upper space in the sealed state are brought into the predetermined first pressure state where the pressures are equal to each other. By instantaneously increasing pressures in the lower space and the upper space around the surrounded space from the pressure-reduced state to the second pressure state where the pressures are equal to each other while maintaining the surrounded space in the first pressure state, partial decoration forming is performed on the decoration forming range in the surrounded space with the decorative film. However, the pressures in the lower space and in the upper space are instantaneously increased while being equal to each other. As described, as a third sealed space between the upper space and the lower partitioned space, the surrounded space is formed in the lower partitioned space. Therefore, even in a case where an indentation, a hole, or a gap exists on the back side of the surface to be decorated of the body to be coated, an influence caused by the sudden pressure difference in the second pressure step is avoided.

According to the second sealing step, by surrounding only a surface to be decorated in the decoration forming range with the surrounding frame, the surrounded space in the sealed state in which the decorative film is stretched over the upper portion thereof can be formed in the lower partitioned space in the sealed state controlled in the first pressure state. According to the second pressure adjusting step, by instantaneously increasing the pressure in the upper space while keeping the surrounded space in the sealed state at the first pressure state, decoration forming can be instantaneously performed on the decoration forming range by the pressure difference between the upper space and the surrounded space. In addition, according to the second pressure adjusting step, by instantaneously increasing the pressures in the upper space and in the lower partitioned space in a state where the pressures remain equal to each other, an influence due to pressure difference is not generated in the lower partitioned space excluding the surrounded space.

EXAMPLE 3

The partial decoration forming apparatus in Example 3 illustrated in FIGS. 14 to 25 is a partial decoration forming apparatus basically having a structure identical to the structure of the partial decoration forming apparatus in Example 1, the apparatus including:

a lower box (1) which has a lower space opened at an upper end, and accommodates in the lower space a body to be coated (W) with a decoration forming range (MA) directed upward;

an upper box (2) which has an upper space (A) opened at a lower end, and can contiguously form the upper space (A) above the lower space in a sealed manner with the decorative film (F) interposed between the lower opening of the upper box (2) and the upper opening of the lower box (1) opposed to each other;

a holding frame (32) which has a frame hole (330) larger than the planar projected area of the decoration forming range (MA) and which can hold a peripheral portion of the decorative film (F) expanded in a lateral direction and can stretch the decorative film (F) in the frame hole (330); and a pressure control device which controls pressures in the upper space (A) and in the lower space in a state where the upper box (2) is arranged on the lower box (1) in a sealed manner. In addition to these structures, the partial decoration forming apparatus further includes:

a surrounding frame body (33) which is arranged to surround an outer edge of the decoration forming range (MA) of the body to be coated (W) and to be in contact with an upper portion of the body to be coated (W);

the fastening base body (3) which is disposed to be locked to the opening (WH1) of the body to be coated (W) and partially projects from the outer edge of the decoration forming range (MA) to the outside of the body to be coated (W) in plan view; and the connecting rod vertically connecting the fastening base body (3) and the holding frame (32) and capable of shortening the vertical connection distance between the fastening base body (3) and the holding frame (32).

Figure 20:
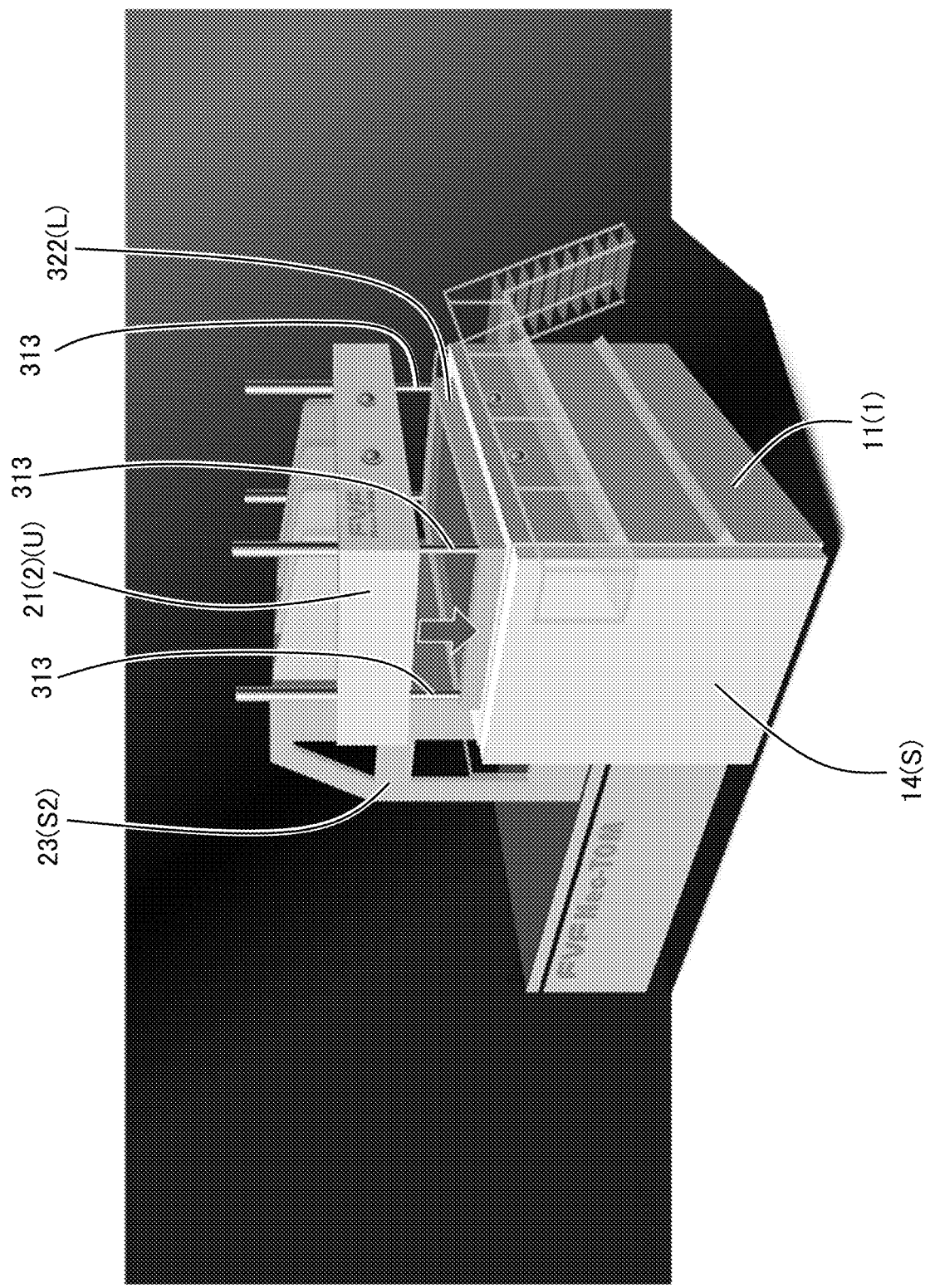
FIG. 20 is an explanatory perspective view illustrating the pre-accommodating step of the partial decoration forming apparatus in Example 3.
Figure 21:
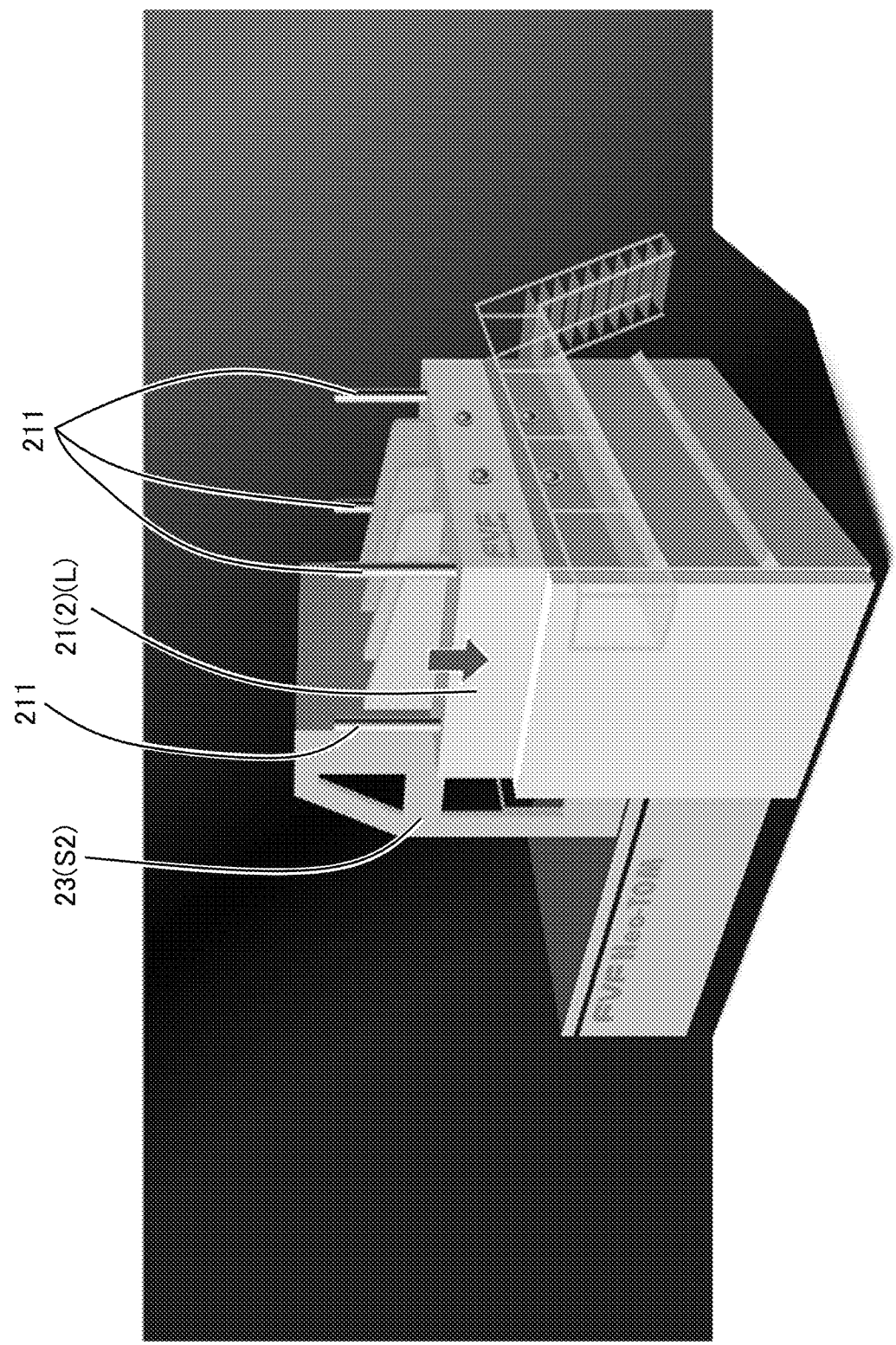
FIG. 21 is an explanatory perspective view illustrating the pre-accommodating step of the partial decoration forming apparatus in Example 3.
Figure 22:
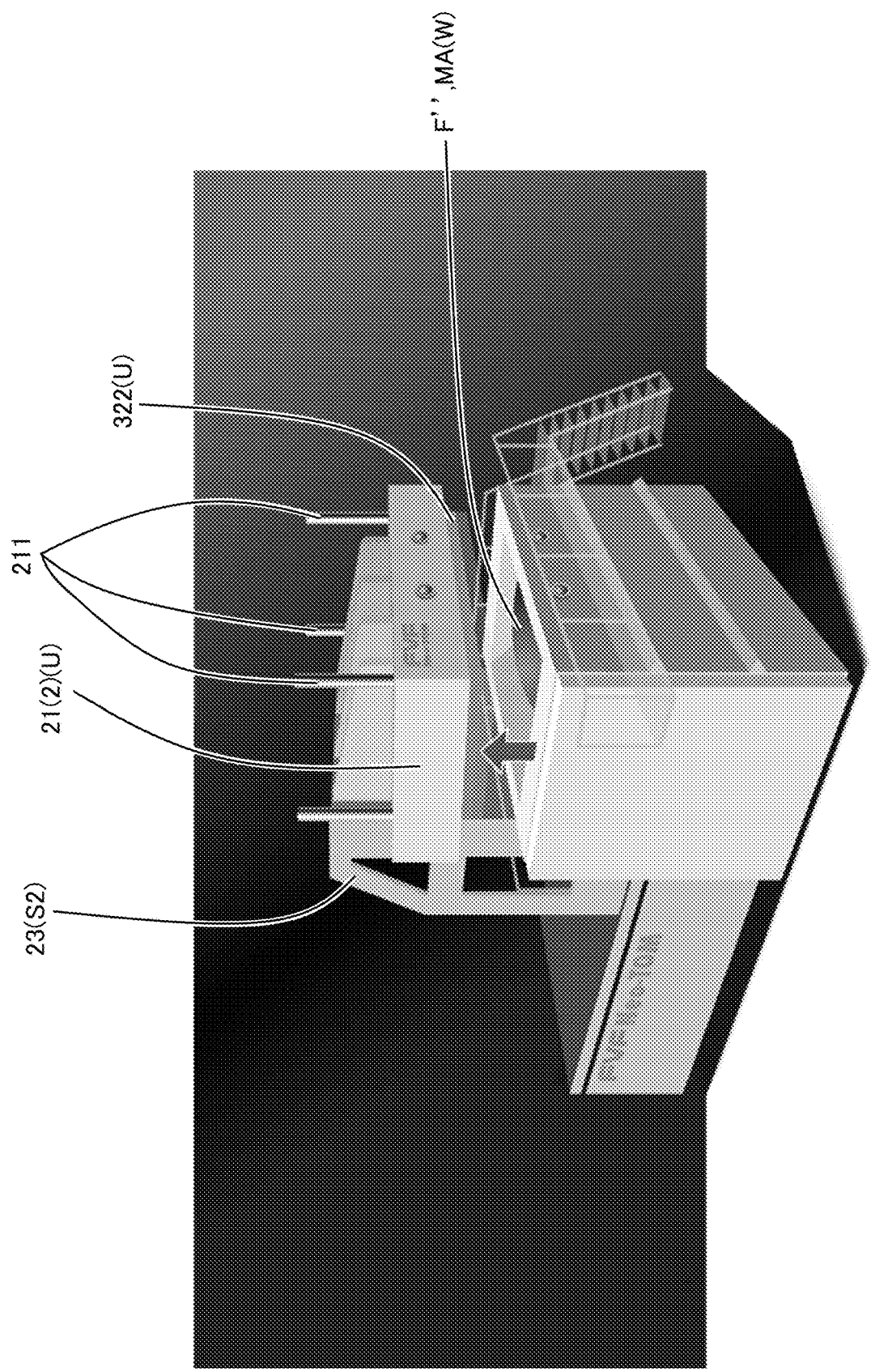
FIG. 22 is an explanatory perspective view illustrating a state after a second pressure adjusting step of the partial decoration forming apparatus in Example 3.
Figure 23:
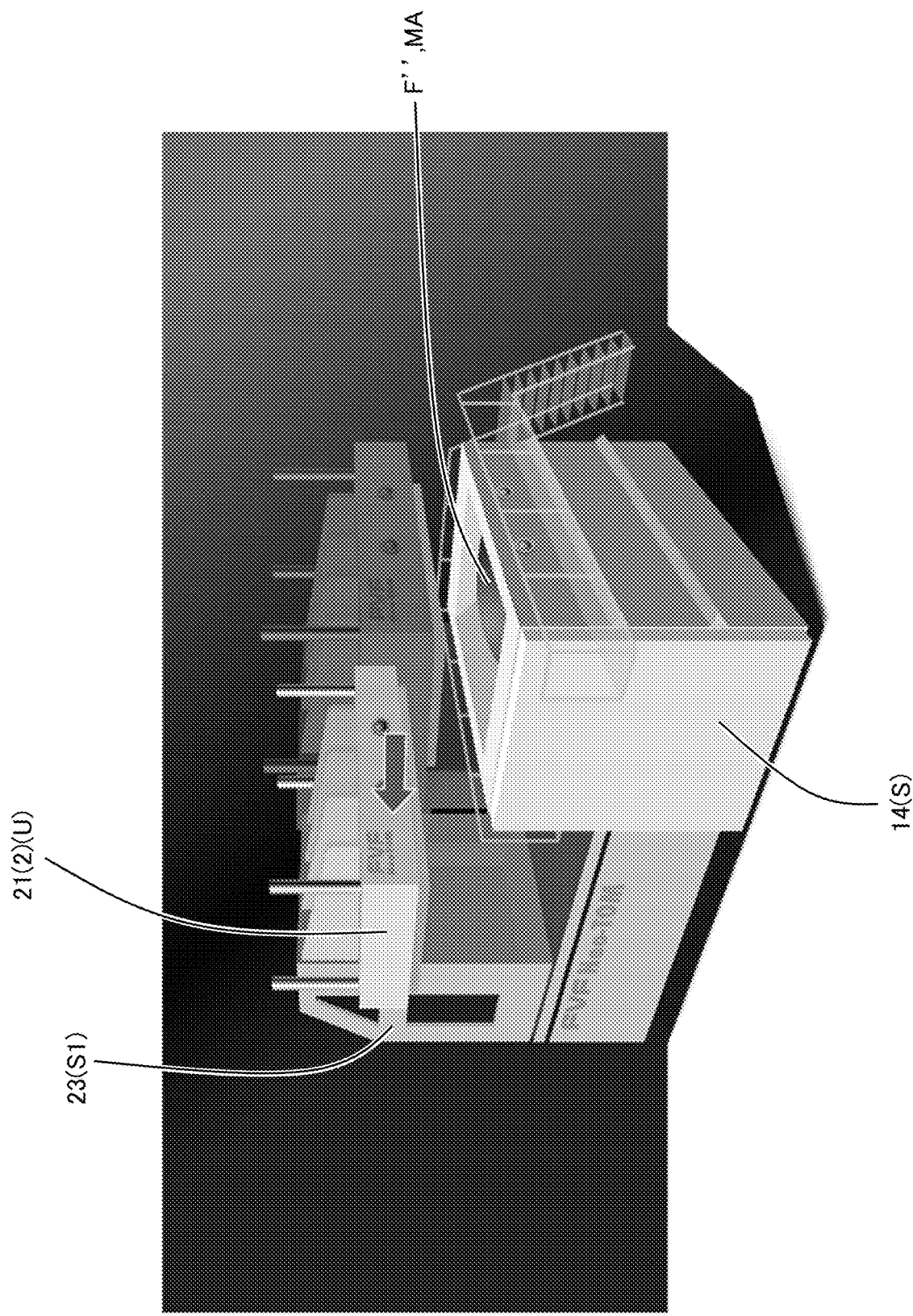
FIG. 23 is an explanatory perspective view illustrating the state after the second pressure adjusting step of the partial decoration forming apparatus in Example 3.

Then, partial decoration forming is performed by the partial decoration forming method which executes the following respective steps illustrated in FIGS. 14 to 25 in order. That is, the method includes:

an accommodating step (FIGS. 14 to 16) of accommodating the body to be coated (W) in the lower box (1) in a state where the decoration forming range (MA) on an upper portion of the body to be coated (W) is exposed to the upper opening (102) side;

a partitioning step (FIG. 17, however, not illustrated) of bringing the surrounding frame body (33) into contact with the peripheral edge of the decoration forming range (MA) on the upper portion of the body to be coated (W), and partitioning a surrounded space (C) in the frame hole (330) of the surrounding frame body (33) above the peripheral edge of the decoration forming range (MA) with which the surrounding frame body (33) is brought into contact, from the lower space inside the lower box;

a film setting step (FIGS. 17 to 19) of expanding the decorative film (F) larger than the planar projected area of the decoration forming range (MA) in the lateral direction above the upper opening or below the lower opening, and bringing the surrounding frame body (33) and the decorative film (F) into contact with each other to block the upper opening of the lower box;

a first sealing step (FIGS. 20 to 21) of sliding a sliding holding frame (23) on a slide base (24) toward the lower box to set a side frame (21) above the upper opening of the lower box (1), the side frame (21) supported at a side thereof by the sliding holding frame (23), to make the upper opening of the lower box (1) and the lower opening of the upper box (2) be opposed to each other (FIG. 19), and lowering an upper fixing frame (322) connected to and supported on the lower surface of the side frame (21) while being supported to bring the upper fixing frame (322) into contact with the upper surface of the decorative film (F), vertically contiguously forming the upper space (A) and the lower space with the decorative film (F) interposed between the lower opening and the upper opening, and forming the upper space (A) in a sealed state and the lower space in the sealed state (FIGS. 20 to 21);

a first pressure adjusting step (FIG. 21, however, pressure adjustment is not illustrated) of causing the pressure control device to bring the lower space in the sealed state and the upper space (A) in the sealed state into a predetermined first pressure state where the pressure in the lower space and the pressure in the upper space (A) are equal to each other;

a second sealing step (FIG. 21, however, pressure adjustment is not illustrated) of bringing the decorative film (F) or the holding frame (32) on the periphery of the decorative film (F) into contact with the surrounding frame body (33) in the lower space in the sealed state to form the surrounded space (C) in a sealed state at the frame inside of the surrounding frame body (33);

a second pressure adjusting step (FIG. 21, however, pressure adjustment is not illustrated) of causing the pressure control device to instantaneously increase the pressure in the lower space in the sealed state excluding the surrounded space (C) in the sealed state and the pressure in the upper space (A) in the sealed state from the pressure-reduced state to a second pressure state where the pressures are equal to each other, while keeping inside of the surrounded space (C) in the sealed state at the first pressure state; and a retracting step (FIGS. 22 to 23) of retracting the side frame (21) and the upper fixing frame (322) upward after the second pressure adjusting step to release the upper opening of the lower box (1), and sliding the sliding holding frame (23) on the slide base (24) in a direction away from the lower box to retract the sliding holding frame (23); and a taking-out step (FIGS. 24 and 25) of changing the front door of the lower box (1) from a closed state (S) into an opened state (O), changing the bottom plate (13) from an accommodated state (I) into a drawn-out state (O) while keeping the body to be coated (W) placed on the bottom plate (13), and taking out the body to be coated subjected to partial decoration.

Other modification, addition, deletion, partial extraction, or integration or separation can be made to the configuration of the apparatus in the present invention within a range not departing from the spirit of the present invention. Alternatively, regarding the respective steps, it is possible to omit some steps, change the order of steps, change part of contents of each step, and add another step.

DESCRIPTION OF REFERENCE SIGNS

F, F', F'': Decorative film
F0: Decorative film roll
MA: Decoration forming range
MD: Indented portion
W: Body to be coated
WH1 WH2 WH3: Opening
1: Lower box
1P: Lower communicating pipe
11: Side frame
12: Frame upper surface
13: Bottom plate (O: Drawn-out state, I: Stored state)
14: Front door (O: Opened state, S: Closed state)
141: Gasket
101: Front opening (O: Opened state, S: Closed state)
102: Upper opening
16: Base frame body
161: Side frame
162: Upper frame
17: Receiving jig
18: Support
2: Upper box
2H: Heater
2P: Upper communicating pipe
21: Side frame
211: Support arm
22: Frame lower surface
202: Lower opening
22: Frame lower surface
202: Lower opening
23: Sliding holding frame
24: Slide base
241: Door rail
22: Frame lower surface
202: Lower opening
31: Fastening base body
31C: Connecting hole
32: Holding frame (U: Lifted position, M: Middle position, L: Lowered position)
321: Lower fixing frame
322: Upper fixing frame
32A: Film holding upper frame
32B: Film holding lower frame
33: Surrounding frame body (P: Compressed state)
331H, 33H: Frame height
33H': Compressed frame height
330: Frame hole
34: Frame driving arm
313, 333, 34: Connecting rod
A: Upper space
B: Lower space excluding surrounded space
C: Surrounded space
4: Holding and regulating body (U: Lifted position, M: Middle position, L: lowered position)
41: Holding band
42: Regulating angle (U: Lifted position, M: Middle position, L: Lowered position)

The invention claimed is:

1. A partial decoration forming method using a decorative film for performing partial decoration forming on a body to be coated by setting a surface in a predetermined range close to one end portion of the body to be coated as a decoration forming range, and sticking the decorative film to the partial decoration forming range using a predetermined partial decoration forming apparatus, the predetermined partial decoration forming apparatus including:
a lower box which has a lower space opened at an upper end, and accommodates in the lower space the body to be coated with the decoration forming range directed upward;
an upper box which has an upper space opened at a lower end, and can contiguously form the upper space above the lower space in a sealed manner with the decorative film interposed between a lower opening of the upper box and an upper opening of the lower box opposed to each other;
a surrounding frame body which is arranged to surround an outer edge of the decoration forming range of the body to be coated and to be in contact with an upper portion of the body to be coated and to be spaced from a bottom plate of the lower box in a vertical direction to form a space accommodating a lower portion of the body to be coated extending from the upper portion outside the surrounding frame body;
a holding frame which has a frame hole larger than a planar projected area of the decoration forming range and which can hold a peripheral portion of the decorative film expanded in a lateral direction and can stretch the decorative film in the frame hole; and
a pressure control device which controls a pressure in the upper space and a pressure in the lower space in a state where the upper box is arranged on the lower box in the sealed manner, the method performed by the predetermined partial decoration forming apparatus and comprising:
an accommodating step of bringing the surrounding frame body into contact with the upper portion of the body to be coated to surround the decoration forming range and accommodating the body to be coated and the surrounding frame body in the lower box;
a film setting step of expanding the decorative film larger than the planar projected area of the decoration forming range in the lateral direction above the upper opening or below the lower opening to hold the peripheral portion of the decorative film with the holding frame;
a first sealing step of forming the upper space in a sealed state and the lower space in a sealed state by vertically contiguously forming the upper space and the lower space with the decorative film interposed between the lower opening of the upper box and the upper opening of the lower box opposed to each other;
a first pressure adjusting step of causing the pressure control device to bring the lower space in the sealed state and the upper space in the sealed state into a predetermined first pressure state where a pressure in the lower space and a pressure in the upper space are equal to each other;
a second sealing step of bringing the decorative film or the holding frame on the periphery of the decorative film into contact with the surrounding frame body in the lower space in the sealed state to form a surrounded space in a sealed state inside of the surrounding frame body; and
a second pressure adjusting step of causing the pressure control device to instantaneously increase the pressure in the lower space in the sealed state excluding the surrounded space in the sealed state and the pressure in the upper space in the sealed state from the predetermined first pressure state to a second pressure state where the pressure in the lower space and the pressure in the upper space are equal to each other, while keeping inside of the surrounded space in the sealed state at the predetermined first pressure state, wherein
partial decoration forming is performed on the decoration forming range in the surrounded space with the decorative film in the second pressure adjusting step.

2. The partial decoration forming method according to claim 1, wherein the first pressure step is a step of simultaneously sucking the lower space in the sealed state excluding the surrounded space and the upper space in the sealed state to bring the lower space excluding the surrounded space and the upper space into the predetermined first pressure state where the pressure is lower than an atmospheric pressure, and the second pressure adjusting step is a step of simultaneously releasing the lower space in the sealed state excluding the surrounded space and the upper space in the sealed state, brought into the predetermined first pressure state in the first pressure adjusting step, to the atmospheric pressure, and bringing the lower space excluding the surrounded space and the upper space into the second pressure state where the pressure is equal to the atmospheric pressure.

3. The partial decoration forming method according to claim 1, wherein
the first sealing step is a step of holding and fixing an edge portion of the decorative film expanded in the lateral direction by the holding frame which is vertically movable, and
accommodating the holding frame that holds the decorative film in one of the lower space and the upper space by contiguously forming the upper space and the lower space, and
the second sealing step is a step of lowering the holding frame to bring a contact upper surface of the body to be coated including the decoration forming range or a contact surface of the surrounding frame body arranged on the body to be coated into contact with an opposed contact surface of the holding frame, and forming the surrounded space surrounded by the contact upper surface of the body to be coated in the decoration forming range, a frame inner surface of the surrounding frame body (33), and a lower surface of the decorative film.

4. The partial decoration forming method according to claim 1,
wherein
the surrounding frame body includes an elastic material which can be elastically deformed by pressure contact in at least one of an arrangement contact portion on the body to be coated and a contact portion which is to be brought into contact with the opposed contact surface of the holding frame, and
the second sealing step is a step of bringing one of a contact surface of the body to be coated including the decoration forming range and a contact surface of the surrounding frame body arranged on the body to be coated close to and pressure-contact with the opposed contact surface of the holding frame, and airtightly forming the surrounded space surrounded by an upper surface of the body to be coated in the decoration forming range, a frame inner surface of the surrounding frame body, and a lower surface of the decorative film.

5. A partial decoration forming method using a decorative film for performing partial decoration forming on a body to be coated by setting a surface in a predetermined range close to one end portion of the body to be coated as a decoration forming range, and sticking the decorative film to the partial decoration forming range using a predetermined partial decoration forming apparatus, the predetermined partial decoration forming apparatus including:

a lower box which has a lower space opened at an upper end, and accommodates in the lower space the body to be coated with the decoration forming range directed upward;

an upper box which has an upper space opened at a lower end, and can contiguously form the upper space above the lower space in a sealed manner with the decorative film interposed between a lower opening of the upper box and an upper opening of the lower box opposed to each other;

a surrounding frame body which is arranged to surround an outer edge of the decoration forming range of the body to be coated and to be in contact with an upper portion of the body to be coated;

a holding frame which has a frame hole larger than a planar projected area of the decoration forming range and which can hold a peripheral portion of the decorative film expanded in a lateral direction and can stretch the decorative film in the frame hole; and a pressure control device which controls a pressure in the upper space and a pressure in the lower space in a state where the upper box is arranged on the lower box in the sealed manner, the method performed by the predetermined partial decoration forming apparatus and comprising:

an accommodating step of bringing the surrounding frame body into contact with the upper portion of the body to be coated to surround the decoration forming range and accommodating the body to be coated and the surrounding frame body in the lower box;

a film setting step of expanding the decorative film larger than the planar projected area of the decoration forming range in the lateral direction above the upper opening or below the lower opening to hold the peripheral portion of the decorative film with the holding frame;

a first sealing step of forming the upper space in a sealed state and the lower space in a sealed state by vertically contiguously forming the upper space and the lower space with the decorative film interposed between the lower opening of the upper box and the upper opening of the lower box opposed to each other;

a first pressure adjusting step of causing the pressure control device to bring the lower space in the sealed state and the upper space in the sealed state into a predetermined first pressure state where a pressure in the lower space and a pressure in the upper space are equal to each other;

a second sealing step of bringing the decorative film or the holding frame on the periphery of the decorative film into contact with the surrounding frame body in the lower space in the sealed state to form a surrounded space in a sealed state at frame inside of the surrounding frame body; and a second pressure adjusting step of causing the pressure control device to instantaneously increase the pressure in the lower space in the sealed state excluding the surrounded space in the sealed state and the pressure in the upper space in the sealed state from the predetermined first pressure state to a second pressure state where the pressures are equal to each other, while keeping inside of the surrounded space in the sealed state at the predetermined first pressure state, wherein partial decoration forming is performed on the decoration forming range in the surrounded space with the decorative film in the second pressure adjusting step, wherein, the body to be coated has an opening under a surface having the decoration forming range, the predetermined partial decoration forming apparatus further includes:

a fastening base body which is disposed to be locked to the opening of the body to be coated and partially projects from the outer edge of the decoration forming range to outside of the body to be coated in plan view; and a connecting rod which vertically connects the fastening base body and the holding frame and capable of shortening a vertical connection distance between the fastening base body and the holding frame, the accommodating step is a step of accommodating the body to be coated in the lower box in a state where the fastening base body is locked to and arranged at the opening of the body to be coated, the film setting step is a step of arranging the holding frame above the fastening base body and above the surrounding frame body, and vertically connecting the holding frame and the fastening base body by the connecting rod, and in the second sealing step, the vertical connection distance between the holding frame and the fastening base body vertically connected is shortened, a distance between the fastening base body and the holding frame is shortened, the surrounding frame body is vertically compressed by the fastening base body and the holding frame, and the surrounded space surrounded by an upper surface of the body to be coated in the decoration forming range, a frame inner surface of the surrounding frame body, and the decorative film is formed in a sealed manner.

6. The partial decoration forming method according to claim 2, wherein the first sealing step is a step of holding and fixing an edge portion of the decorative film expanded in the lateral direction by the holding frame which is vertically movable, and accommodating the holding frame that holds the decorative film in one of the lower space and the upper space by contiguously forming the upper space and the lower space, and the second sealing step is a step of lowering the holding frame to bring a contact upper surface of the body to be coated including the decoration forming range or a contact surface of the surrounding frame body arranged on the body to be coated into contact with an opposed contact surface of the holding frame, and forming the surrounded space surrounded by the contact upper surface of the body to be coated in the decoration forming range, a frame inner surface of the surrounding frame body (33), and a lower surface of the decorative film.

7. The partial decoration forming method according to claim 2, wherein the surrounding frame body includes an elastic material which can be elastically deformed by pressure contact in at least one of an arrangement contact portion on the body to be coated and a contact portion which is to be brought into contact with the opposed contact surface of the holding frame, and the second sealing step is a step of bringing one of a contact surface of the body to be coated including the decoration forming range and a contact surface of the surrounding frame body arranged on the body to be coated close to and pressure-contact with the opposed contact surface of the holding frame, and airtightly forming the surrounded space surrounded by an upper surface of the body to be coated in the decoration forming range, a frame inner surface of the surrounding frame body, and a lower surface of the decorative film.

8. The partial decoration forming method according to claim 3, wherein the surrounding frame body includes an elastic material which can be elastically deformed by pressure contact in at least one of an arrangement contact portion on the body to be coated and a contact portion which is to be brought into contact with the opposed contact surface of the holding frame, and the second sealing step is a step of bringing one of a contact surface of the body to be coated including the decoration forming range and a contact surface of the surrounding frame body arranged on the body to be coated close to and pressure-contact with the opposed contact surface of the holding frame, and airtightly forming the surrounded space surrounded by an upper surface of the body to be coated in the decoration forming range, a frame inner surface of the surrounding frame body, and a lower surface of the decorative film.

9. The partial decoration forming method according to claim 6, wherein the surrounding frame body includes an elastic material which can be elastically deformed by pressure contact in at least one of an arrangement contact portion on the body to be coated and a contact portion which is to be brought into contact with the opposed contact surface of the holding frame, and the second sealing step is a step of bringing one of a contact surface of the body to be coated including the decoration forming range and a contact surface of the surrounding frame body arranged on the body to be coated close to and pressure-contact with the opposed contact surface of the holding frame, and airtightly forming the surrounded space surrounded by an upper surface of the body to be coated in the decoration forming range, a frame inner surface of the surrounding frame body, and a lower surface of the decorative film.

10. The partial decoration forming method according to claim 2, wherein, the body to be coated has an opening under a surface having the decoration forming range, the predetermined partial decoration forming apparatus further includes:

a fastening base body which is disposed to be locked to the opening of the body to be coated and partially projects from the outer edge of the decoration forming range to outside of the body to be coated in plan view; and a connecting rod which vertically connects the fastening base body and the holding frame and capable of shortening a vertical connection distance between the fastening base body and the holding frame, the accommodating step is a step of accommodating the body to be coated in the lower box in a state where the fastening base body is locked to and arranged at the opening of the body to be coated, the film setting step is a step of arranging the holding frame above the fastening base body and above the surrounding frame body, and vertically connecting the holding frame and the fastening base body by the connecting rod, and in the second sealing step, the vertical connection distance between the holding frame and the fastening base body vertically connected is shortened, a distance between the fastening base body and the holding frame is shortened, the surrounding frame body is vertically compressed by the fastening base body and the holding frame, and the surrounded space surrounded by an upper surface of the body to be coated in the decoration forming range, a frame inner surface of the surrounding frame body, and the decorative film is formed in a sealed manner.

11. The partial decoration forming method according to claim 3, wherein, the body to be coated has an opening under a surface having the decoration forming range, the predetermined partial decoration forming apparatus further includes:

a fastening base body which is disposed to be locked to the opening of the body to be coated and partially projects from the outer edge of the decoration forming range to outside of the body to be coated in plan view; and a connecting rod which vertically connects the fastening base body and the holding frame and capable of shortening a vertical connection distance between the fastening base body and the holding frame, the accommodating step is a step of accommodating the body to be coated in the lower box in a state where the fastening base body is locked to and arranged at the opening of the body to be coated, the film setting step is a step of arranging the holding frame above the fastening base body and above the surrounding frame body, and vertically connecting the holding frame and the fastening base body by the connecting rod, and in the second sealing step, the vertical connection distance between the holding frame and the fastening base body vertically connected is shortened, a distance between the fastening base body and the holding frame is shortened, the surrounding frame body is vertically compressed by the fastening base body and the holding frame, and the surrounded space surrounded by an upper surface of the body to be coated in the decoration forming range, a frame inner surface of the surrounding frame body, and the decorative film is formed in a sealed manner.

12. The partial decoration forming method according to claim 4, wherein, the body to be coated has an opening under a surface having the decoration forming range, the predetermined partial decoration forming apparatus further includes:

a fastening base body which is disposed to be locked to the opening of the body to be coated and partially projects from the outer edge of the decoration forming range to outside of the body to be coated in plan view; and a connecting rod which vertically connects the fastening base body and the holding frame and capable of shortening a vertical connection distance between the fastening base body and the holding frame, the accommodating step is a step of accommodating the body to be coated in the lower box in a state where the fastening base body is locked to and arranged at the opening of the body to be coated, the film setting step is a step of arranging the holding frame above the fastening base body and above the surrounding frame body, and vertically connecting the holding frame and the fastening base body by the connecting rod, and in the second sealing step, the vertical connection distance between the holding frame and the fastening base body vertically connected is shortened, a distance between the fastening base body and the holding frame is shortened, the surrounding frame body is vertically compressed by the fastening base body and the holding frame, and the surrounded space surrounded by an upper surface of the body to be coated in the decoration forming range, a frame inner surface of the surrounding frame body, and the decorative film is formed in a sealed manner.

13. The partial decoration forming method according to claim 6, wherein, the body to be coated has an opening under a surface having the decoration forming range, the predetermined partial decoration forming apparatus further includes:

a fastening base body which is disposed to be locked to the opening of the body to be coated and partially projects from the outer edge of the decoration forming range to outside of the body to be coated in plan view; and a connecting rod which vertically connects the fastening base body and the holding frame and capable of shortening a vertical connection distance between the fastening base body and the holding frame, the accommodating step is a step of accommodating the body to be coated in the lower box in a state where the fastening base body is locked to and arranged at the opening of the body to be coated, the film setting step is a step of arranging the holding frame above the fastening base body and above the surrounding frame body, and vertically connecting the holding frame and the fastening base body by the connecting rod, and in the second sealing step, the vertical connection distance between the holding frame and the fastening base body vertically connected is shortened, a distance between the fastening base body and the holding frame is shortened, the surrounding frame body is vertically compressed by the fastening base body and the holding frame, and the surrounded space surrounded by an upper surface of the body to be coated in the decoration forming range, a frame inner surface of the surrounding frame body, and the decorative film is formed in a sealed manner.

14. The partial decoration forming method according to claim 7, wherein, the body to be coated has an opening under a surface having the decoration forming range, the predetermined partial decoration forming apparatus further includes:

a fastening base body which is disposed to be locked to the opening of the body to be coated and partially projects from the outer edge of the decoration forming range to outside of the body to be coated in plan view; and a connecting rod which vertically connects the fastening base body and the holding frame and capable of shortening a vertical connection distance between the fastening base body and the holding frame, the accommodating step is a step of accommodating the body to be coated in the lower box in a state where the fastening base body is locked to and arranged at the opening of the body to be coated, the film setting step is a step of arranging the holding frame above the fastening base body and above the surrounding frame body, and vertically connecting the holding frame and the fastening base body by the connecting rod, and in the second sealing step, the vertical connection distance between the holding frame and the fastening base body vertically connected is shortened, a distance between the fastening base body and the holding frame is shortened, the surrounding frame body is vertically compressed by the fastening base body and the holding frame, and the surrounded space surrounded by an upper surface of the body to be coated in the decoration forming range, a frame inner surface of the surrounding frame body, and the decorative film is formed in a sealed manner.

15. The partial decoration forming method according to claim 8, wherein, the body to be coated has an opening under a surface having the decoration forming range, the predetermined partial decoration forming apparatus further includes:

a fastening base body which is disposed to be locked to the opening of the body to be coated and partially projects from the outer edge of the decoration forming range to outside of the body to be coated in plan view; and a connecting rod which vertically connects the fastening base body and the holding frame and capable of shortening a vertical connection distance between the fastening base body and the holding frame, the accommodating step is a step of accommodating the body to be coated in the lower box in a state where the fastening base body is locked to and arranged at the opening of the body to be coated, the film setting step is a step of arranging the holding frame above the fastening base body and above the surrounding frame body, and vertically connecting the holding frame and the fastening base body by the connecting rod, and in the second sealing step, the vertical connection distance between the holding frame and the fastening base body vertically connected is shortened, a distance between the fastening base body and the holding frame is shortened, the surrounding frame body is vertically compressed by the fastening base body and the holding frame, and the surrounded space surrounded by an upper surface of the body to be coated in the decoration forming range, a frame inner surface of the surrounding frame body, and the decorative film is formed in a sealed manner.

16. The partial decoration forming method according to claim 9, wherein, the body to be coated has an opening under a surface having the decoration forming range, the predetermined partial decoration forming apparatus further includes:
a fastening base body which is disposed to be locked to the opening of the body to be coated and partially projects from the outer edge of the decoration forming range to outside of the body to be coated in plan view; and
a connecting rod which vertically connects the fastening base body and the holding frame and capable of shortening a vertical connection distance between the fastening base body and the holding frame,
the accommodating step is a step of accommodating the body to be coated in the lower box in a state where the fastening base body is locked to and arranged at the opening of the body to be coated,
the film setting step is a step of arranging the holding frame above the fastening base body and above the surrounding frame body, and vertically connecting the holding frame and the fastening base body by the connecting rod, and
in the second sealing step, the vertical connection distance between the holding frame and the fastening base body vertically connected is shortened, a distance between the fastening base body and the holding frame is shortened, the surrounding frame body is vertically compressed by the fastening base body and the holding frame, and the surrounded space surrounded by an upper surface of the body to be coated in the decoration forming range, a frame inner surface of the surrounding frame body, and the decorative film is formed in a sealed manner.

* * * * *